United States Patent
Tomita et al.

(10) Patent No.: US 8,611,332 B2
(45) Date of Patent: Dec. 17, 2013

(54) COMMUNICATION APPARATUS, BASE STATION APPARATUS AND DATA RECEPTION TIMING SYNCHRONIZING METHOD

(75) Inventors: Tetsuo Tomita, Kawasaki (JP); Tomonori Kumagai, Kawasaki (JP); Daisuke Nitta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 551 days.

(21) Appl. No.: 12/784,191

(22) Filed: May 20, 2010

(65) Prior Publication Data
US 2010/0315998 A1 Dec. 16, 2010

Related U.S. Application Data

(63) Continuation of application No. PCT/JP2007/072531, filed on Nov. 21, 2007.

(51) Int. Cl.
  *H04J 3/06* (2006.01)
  *H04B 7/212* (2006.01)
(52) U.S. Cl.
  USPC .......................... 370/350; 370/324
(58) Field of Classification Search
  USPC .......... 370/328, 338, 503, 324, 350
  See application file for complete search history.

(56) References Cited

U.S. PATENT DOCUMENTS

| | | | |
|---|---|---|---|
| 8,149,726 B2 * | 4/2012 | Wei | 370/252 |
| 8,155,013 B2 * | 4/2012 | Jeong et al. | 370/248 |
| 2001/0046240 A1 * | 11/2001 | Longoni et al. | 370/503 |
| 2003/0002459 A1 * | 1/2003 | Igarashi et al. | 370/330 |
| 2003/0216155 A1 | 11/2003 | Kobayashi | |
| 2003/0223422 A1 | 12/2003 | Igarashi et al. | |
| 2004/0087371 A1 | 5/2004 | Yamana et al. | |
| 2004/0087372 A1 | 5/2004 | Yamana et al. | |

(Continued)

FOREIGN PATENT DOCUMENTS

| | | |
|---|---|---|
| JP | 11145992 | 5/1999 |
| JP | 2001198363 | 7/2001 |

(Continued)

OTHER PUBLICATIONS

Susumu Ishihara, Denshi Shakai to Security Gijutsu-Ango to Kojin Ninsho o Chushin ni, Computer Today, vol. 19, No. 1, Dec. 20, 2001, vol. 19 with partial translation; pp. 26 to 31.

(Continued)

*Primary Examiner* — Ayaz Sheikh
*Assistant Examiner* — Hoang-Chuong Vu
(74) *Attorney, Agent, or Firm* — Smith, Gambrell & Russell, LLP

(57) ABSTRACT

A communication apparatus comprises a processing information acquiring unit to acquire a processing delay time, a transmission information acquiring unit to acquire each transmission delay time, a collecting unit to collect each arrival time from nodes onward from each of the subordinated nodes, a calculating unit to calculate the time after distribution data is received by the self-node until it arrives at each of the terminals as the arrival time from the home node onward for each of the nodes through which the distribution data is routed based on the processing delay time, the transmission delay times, and each the arrival time from the node onward, and a transmission control unit to control the transmission timing of the distribution data to at least one of the nodes based on the arrival times from the home node onward for each of the nodes.

3 Claims, 17 Drawing Sheets

(56) References Cited

U.S. PATENT DOCUMENTS

| | | | |
|---|---|---|---|
| 2004/0247124 A1* | 12/2004 | Kamachi | 380/255 |
| 2005/0041692 A1* | 2/2005 | Kallstenius | 370/503 |
| 2008/0165699 A1* | 7/2008 | Wei | 370/252 |
| 2008/0247372 A1* | 10/2008 | Chion et al. | 370/338 |
| 2009/0116420 A1* | 5/2009 | Jeong et al. | 370/312 |
| 2009/0174599 A1* | 7/2009 | Taniguchi | 342/357.08 |
| 2009/0316665 A1* | 12/2009 | Adjakple et al. | 370/336 |
| 2011/0026404 A1* | 2/2011 | Rappaport | 370/235 |
| 2011/0299521 A1* | 12/2011 | Shao et al. | 370/350 |

FOREIGN PATENT DOCUMENTS

| | | |
|---|---|---|
| JP | 2001198363 A | 7/2001 |
| JP | 2003333647 A | 11/2003 |
| JP | 2004056770 | 2/2004 |
| JP | 2004056770 A | 2/2004 |
| WO | 03086003 | 10/2003 |
| WO | 03086003 A1 | 10/2003 |

OTHER PUBLICATIONS

Technical Specification Group Radio Access Network, "Introduction of the Multimedia Broadcast Multicast Service (MBMS) in the Radio Access Network (RAN) Stage 2 (Release 7)", 3rd Generation Partnership Project, 3GPP TS 25.346 V 7.3.0, Mar. 2007.
International Search Report dated Dec. 18, 2007 in corresponding International application No. PCT/JP2007/072531.
Japanese Notice of Reason for Rejection dated May 8, 2012 issued in application No. 2009-542435.
Notification of Transmittal of Translation of the International Preliminary Report on Patentability dated Jun. 17, 2010.

* cited by examiner

COMMUNICATION APPARATUS, BASE STATION APPARATUS AND DATA RECEPTION TIMING SYNCHRONIZING METHOD

CROSS-REFERENCE TO RELATED APPLICATIONS

This is a continuation of Application PCT/JP2007/072531, filed on Nov. 21, 2007, now pending, the contents of which are herein wholly incorporated by reference.

FIELD

The present invention relates to a technology of synchronizing data reception timings in a plurality of terminal devices.

BACKGROUND

Over the recent years, a mobile communication technology has been diversified such as WiMAX (Worldwide Interoperability for Microwave Access) and S3G (Super 3rd Generation) and has been greatly developed by scheming a speedup with HSDPA (High Speed Downlink Packet Access) etc and advancing development of a communication network like NGN (Next Generation Network). Besides, the mobile communication terminal has an increased memory capacity and an increased throughput and also has an improvement of standby time. Moreover, there is a rapid spread in utilizing wireless communications in data communications performed by mobile information terminals such as PDA (Personal Digital Assistants).

With the development of the mobile communication technology such as this, it is considered that applications of the mobile communications will be evolved into an exchange of contents and distribution of the contents between users and further into a variety of services from a simple voice call and an exchange of mails. For example, the Internet etc provides a file exchange, a service for providing user contents advocated in Web2.0 (which is a service for exchanging and changing the user's own contents between the users) and a service for exchanging information by sharing the contents (games etc) in real time between the plurality of users as in the case of an online game, and it is considered that these services will be utilized on the mobile phones.

In particular, if mobility of the mobile phone is utilized, it is feasible to provide a service in which the same information is shared simultaneously between the plurality of users existing in different places, and the users further share feelings etc obtained from the same information with each other. For example, this is a service in which a moving picture captured by one user is distributed in real time to a plurality of friends existing in different places. In this service, the plurality of friends views the same moving picture all together, speaks of their impressions with each other corresponding to details of the picture and conducts operations such as temporarily stopping and rewinding the moving picture at desired timings (e.g.: distribution of moving picture+voice communications+PKT communications).

Note that the following documents are disclosed as the documents of the conventional arts related to the invention of the present application.
[Patent document 1] Japanese Patent Laid-Open Publication No. H11-145992
[Non-Patent document 1] Technical Specification Group Radio Access Network, "Introduction of the Multimedia Broadcast Multicast Service (MBMS) in the Radio Access Network (RAN) Stage 2 (Release 7)", 3rd Generation Partnership Project, 3GPP TS 25.346 V7.3.0, March 2007

SUMMARY

In the case of realizing the services described above, however, the conventional mobile communication system has such a problem that arrival timings of the data, which is multicasted or broadcasted, are different between the mobile communication terminals and between the communication services. This problem arises from a difference in communication speed between a high-speed channel using HSDPA and a normal channel other than the high-speed channel, a difference in processing speed that is caused between the devices configuring the mobile communication system, a difference between communication routes within the mobile communication system, and so on.

If the data reception timings are different on the respective mobile communication terminals, the individual users can not share the same information at the same time, and feedbacks based on this information are also different. Specifically, according to the examples of the services described above, in the case of desiring to temporarily stop the pictures of all the members on favorite images in the middle of the plurality of users viewing the moving picture together, if the view timings of the favorite images of the users are different, the intended favorite image can not be conveyed to other users. Further, even when a certain user talks matching with a predetermined image, the users can not share the feelings obtained from the same information with each other unless the view contents (on-listening sounds and on-viewing scenes of the moving picture) of other users are coincident at that moment. For example, if the plurality of users performs a net game, a battle scene viewed by the individuals is not matched with an operation, and the users can not fight (operate) with each other in cooperation.

The present invention adopts the following configurations in consideration of the problems given above. Namely, a first mode of the present invention relates to a communication apparatus to manage a plurality of nodes which perform communications with a plurality of terminal devices, and the communication apparatus includes: a processing information acquiring unit to acquire processing delay time after distribution data has been received by the self-node (communication apparatus itself) until the distribution data is transmitted by the self-node; a transmission information acquiring unit to acquire each transmission delay time after the distribution data has been transmitted by the self-node until the distribution data is received by each of the nodes; a the distribution data is received by each of the nodes; a collecting unit to collect, as arrival time from the node onward, each a period of time after the distribution data has been received by each of the nodes until the distribution data arrives at each of the plurality of terminal devices; a calculating unit to respectively calculate, as the arrival time from the self-node onward, a period of time after the distribution data has been received by the self-node until the distribution data arrives at each of the plurality of terminal devices for each of the nodes through which the distribution data passes based on the processing delay time, the transmission delay time and each the arrival time from the node onward; and transmission control unit to control a transmission timing of the distribution data to at least one of the plurality of nodes on the basis of the arrival time from the self-node onward for each of the nodes.

Herein, the processing delay time connotes the time expended after the distribution data has been received by the communication apparatus until the distribution data is transmitted toward the node and also connotes the time including the processing time etc. Further, the transmission delay time implies the time expended after the distribution data has been transmitted by the communication apparatus until the distribution data is received by the node and also implies the time including the transmission time on a communication line.

In the communication apparatus according to the first mode of the present invention, the processing delay time and the transmission delay time described above are acquired. The processing delay time and the transmission delay time may be acquired from results of measurements and calculations conducted and may also be acquired from a table etc that is retained beforehand within the communication apparatus. Further, the arrival time from the node onward is collected from each node.

Subsequently, the arrival time from the self-node (communication apparatus itself) onward is respectively calculated based on these acquired and collected items of information for each of the nodes through which the distribution data passes. Eventually, the distribution data transmission timing to at least one of the plurality of nodes is controlled by the transmission control unit so as to equalize the arrival time from the self-node onward on a route via every node.

Hence, the communication apparatus according to the first mode of the present invention enables the synchronization of at least a period of time after the distribution data has been received by the communication apparatus until the distribution data arrives at the respective terminal devices, i.e., the synchronization of the reception timings of the distribution data at the respective terminal devices from the communication apparatus onward.

Further, preferably, the communication apparatus according to the first mode of the present invention further includes: a criterion determining unit to determine, as criterial arrival time, the longest arrival time among periods of the arrival time from the self-node onward which are calculated by the calculating unit; and a transmitting unit to transmit the criterial arrival time determined by the criterion determining unit to other communication nodes configuring the communication system, wherein the transmission control unit delays the transmission timing of the distribution data in a way that sets, as delay time, a time difference between the criterial arrival time determined by the criterion determining unit and another arrival time.

With this configuration, all periods of arrival time from the communication terminals onward for each of the node can be made coincident with the arrival time on the route requiring the longest period of time among the respective routes via the individual nodes. Namely, even when the plurality of terminal devices receives the distribution data on the route via every node from the communication apparatus onward, it is possible to synchronize the reception timings of the distribution data at all the terminal devices.

Still further, preferably, the communication apparatus according to the first mode of the present invention further includes: an external information acquiring unit to acquire external transmission delay time after the distribution data has been transmitted from an external distributor server until the distribution data is received by the self-node (communication apparatus itself); a receiving unit to receive the external transmission delay time and the criterial arrival time with respect to another communication node from the another communication node; and a total arrival time calculating unit to calculate, based on the criterial arrival time determined by the criterion determining unit and the external transmission delay time acquired by the external information acquiring unit, total arrival time with respect to the self-node after the distribution data has been transmitted from the external server until the distribution data arrives at each of the plurality of terminal devices via the self-node, and to calculate, based on the external transmission delay time with respect to the another communication node and the criterial arrival time that are received by the receiving unit, total arrival time with respect to the another communication node after the distribution data has been transmitted from the external server until the distribution data arrives at each of the plurality of terminal devices via the another communication node, wherein the transmission control unit corrects the delay time on the basis of the total arrival time with respect to the self-node that is calculated by the total calculating unit and the total arrival time with respect to the another communication node, and delays the transmission timing of the distribution data.

In this configuration, there is acquired the external transmission delay time after the distribution data has been transmitted from the external server which distributes the distribution data until the distribution data is received by the self-node. This external transmission delay time may be acquired from the results of the measurements and the calculations conducted and may also be acquired from the table etc that is retained beforehand within the communication apparatus. Moreover, the criterial arrival time determined by another communication node partly configuring the communication system and the external transmission delay time acquired by another communication node by the same method as by the communication apparatus described above, are received from another communication node.

Subsequently, the total arrival time from the distributor external server to the plurality of recipient terminal devices is calculated based on the thus-acquired or received information in regard to a case of passing through the self-node and a case of passing through another communication node, respectively. Eventually, the previously-determined delay time is corrected, and the distribution data transmission timing is delayed based on the corrected delay time so as to equalize the thus-calculated total arrival time in both of the case of passing through the self-node and the case of passing through another communication node.

Therefore, this configuration enables the synchronization of the periods after the distribution data has been transmitted from the distributor server until the distribution data arrives at the respective terminal devices, i.e., the synchronization of the reception timings of the distribution data at all the terminal devices.

Yet further, preferably, the communication apparatus according to the first mode of the present invention further includes, the distribution data being distributed from the external server enabled to perform the communications with the communication system or distributed from at least one of the plurality of terminal devices, a loopback transmitting unit to transmit, when the distribution data is distributed from at least one of the plurality of terminal devices, the distribution data received from at least one of the plurality of nodes to any plural nodes among the plurality of nodes in order to distribute the distribution data to any plural terminal devices among the plurality of terminal devices.

According this configuration, in both of the case of distributing the distribution data from the external server and the case of distributing the distribution data from the terminal device enabled to perform the communications with the communication system, it is feasible to synchronize the distribution data reception timings at the respective terminal devices which receive the distribution data.

A second mode of the present invention relates to a base station apparatus to perform wireless communications with a plurality of mobile terminals, and the base station apparatus includes: a processing information acquiring unit to acquire processing delay time after distribution data has been received by the self-node until the distribution data is transmitted from the self-node (base station apparatus itself); a transmission information acquiring unit to acquire each transmission delay time after the distribution data has been transmitted from the self-node until the distribution data is received by each of the mobile terminals; a calculating unit to calculate each arrival time after the distribution data has been received by the self-node until the distribution data arrives at each of the mobile terminals based on the processing delay time and each transmission delay time; and a transmission control unit to control a transmission timing of the distribution data to at least one of the plurality of mobile terminals based on a difference between the respective periods of arrival time.

According to the second mode of the present invention, the reception timings of the distribution data at the respective mobile terminals can be synchronized by the same operation as in the first mode described above between the plurality of mobile terminals and the base station apparatus wirelessly connected to these mobile terminals.

Yet further, preferably the base station apparatus according to the second mode of the present invention further includes: a criterion determining unit to determine, as criterial arrival time, the longest arrival time among periods of the arrival time calculated by the calculating unit; and host transmitting unit to transmit the criterial arrival time determined by the criterion determining unit to a host apparatus to manage the base station apparatus, wherein the transmission control unit delays the transmission timing of the distribution data in a way that sets, as delay time, a time difference between the criterial arrival time determined by the criterion determining unit and another arrival time.

With this configuration, all the periods of arrival time of the distribution data from the base station apparatus to the respective mobile terminals can be made coincident with the arrival time having the longest period of time. Namely, the reception timings of the distribution data at all the terminal devices from the base station apparatus onward can be synchronized. Moreover, the criterial arrival time for synchronizing the reception timings is transmitted to the higher-order host apparatus, whereby the host apparatus can take the same timing synchronizing process.

It should be noted that the present invention may also be a method or a program making a computer actualizing the communication apparatus or the base station apparatus realize any one of the functions described above. Further, the present invention may also be a readable-by-computer storage medium recorded with such a program.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

A mobile communication system in an embodiment will hereinafter be described with reference to the drawings. Configurations in the embodiments are exemplifications, and the embodiment is not limited to the configurations in the embodiments. For example, the embodiment will exemplify the mobile communication system, however, a communication system is also available, which provides a communication service to not a mobile apparatus connected through wireless communications but a terminal device such as a personal computer connected via a cable.

[System Architecture]

Figure 1:
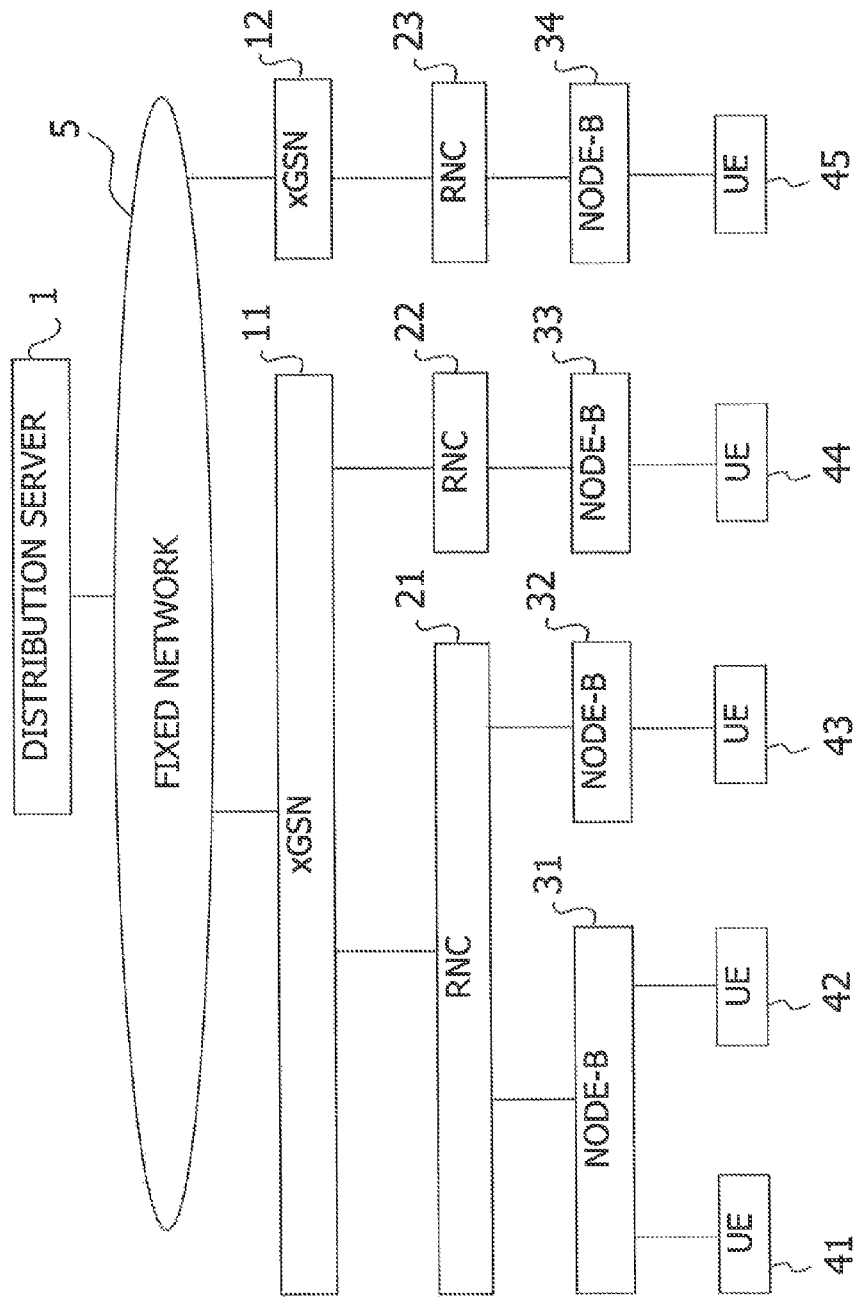
FIG. 1 is a diagram illustrating an example of a system architecture of a mobile communication system in an embodiment.

A system architecture of the mobile communication system in the embodiment will hereinafter be described with reference to FIG. 1. FIG. 1 is a diagram illustrating an example of the system architecture of the mobile communication system in the embodiment and also depicting an example of a logical configuration of the mobile communication system, which is specified by 3GPP (3rd Generation Partnership Project).

As illustrated in FIG. 1, the mobile communication system in the embodiment is configured by xGSNs (serving/gateway General packet radio service Support Nodes) 11 and 12, RNCs (Radio Network Controllers) 21, 22 and 23, and NODE-B(s) 31, 32, 33 and 34. Hereafter, the devices such as the xGSN, the RNC and the NODE-B are termed nodes as the case may be. It should be noted that the embodiment exemplifies the system architecture utilized in the W-CDMA (Wideband Code Division Multiple Access) mobile communication system, however, the embodiment does not limit these communication systems and system architectures, and an available system is the mobile communication system in which each node has a hierarchical configuration. To give a further description, each of these nodes is not required to be configured as a separate device, and a single communication apparatus may be configured in a way that includes the RNC and the NODE-B. Further, the embodiment exemplifies a packet communication service by way of a communication service provided to the mobile apparatuses (which will hereinafter be each termed UE (User Equipment)) 41, 42, 43, 44 and 45 from the mobile communication system, however, as a matter of course, a call service etc other than this packet communication service may also be provided in combination.

The respective nodes are hierarchized and thus connected by communication lines. For example, an xGSN 11 is connected to RNCs 21 and 22 under management, and an xGSN 12 is connected to an RNC 23 under the management, while both of the xGSNs 11 and 12 are connected on the other side to a fixed network 5. The fixed network 5 is, e.g., an IP (Internet Protocol) network such as the Internet. The RNC 21 is connected to the NODE-B 31 and the NODE-B 32 under the management, the RNC 22 is connected to the NODE-B 33 under the management, and the RNC 23 is connected to the NODE-B 34 under the management.

Hereinafter, a node serving as a benchmark for the explanation is referred to as a target node, nodes connected to and managed by the target node are termed managed nodes (managed nodes), a high-order node connected to the target node and managing the target node is termed a host node, a node having none of the host node is termed a top node as the case may be. In the case of the embodiment, the top nodes are the xGSNs 11 and 12. Further, in the case of setting the RNC 21 as the target node, the managed nodes are the NODE-B 31 and the NODE-B 32, and the host node is the xGSN 11.

An outline of each of the nodes configuring the mobile communication system in the embodiment will hereinafter be described. Note that characteristic functions, related to the embodiment, of the respective nodes will be described later on. Moreover, in the following discussion, the reference numerals and symbols are omitted unless required to specify the individual components.

The NODE-B (31, 31, 33, 34) is a logical node corresponding to a wireless base station. The NODE-B connects the UE within a cell formed by the NODE-B itself to the mobile communication system through the wireless communications. The NODE-B converts a radio signal transmitted from the UE into a data frame by demodulating the radio signal, and thus forwards the data frame to the RNC. On the other hand, the NODE-B converts control data, user data, etc transmitted from the RNC into a wireless frame by modulating these pieces of data and thus transmits the wireless frame.

The RNC (21, 22, 23) is the logical node having a media access control (MAC) function and a radio link control (RLC) function of executing a wireless interface protocol of Layer2 (data link layer) and a radio resource control (RRC) function of executing the wireless interface protocol of Layer 3 (network layer), and controlling the NODE-B under the management. The MAC function is a function of executing logical channel transmission, radio resource allocation, etc. The RLC function is a function of executing retransmission control, flow control, etc. The RRC function is a function of executing broadcast of system information to the UEs, UE calling control, radio bearer setup, radio bearer release, etc by use of logical channels provided from the MAC function and the RLC function.

The RNC configures a radio access network in cooperation with the NODE-B. The RNC receives an IP packet transmitted from the xGSN and transmits the received IP packet to the UE by employing the set radio bearer.

The xGSN (11, 12) is a logical node configured by integrating an SGSN (Serving General packet radio service Support Node) with a GGSN (Gateway General packet radio service Support Node), and provides the packet communication service to the UEs connecting with the mobile communication system. Specifically, the xGSN manages a position of the UE which performs the packet communications, and executes session management and also executes packet forwarding of user traffic sent from the RNC under the management.

The xGSN controls the connection to the fixed network 5 in response to a connection request given from the UE. The xGSN forwards the IP packet transmitted from the UE and received via the radio access network (the NODE-B and the RNC) under the management to the fixed network 5. Reversely, the xGSN forwards the IP packet sent from the fixed network 5 to the RNC within the radio access network to which the predetermined UE is connected. The xGSN in the embodiment forwards distribution data transmitted from a distribution server 1 defined as an external server connected to the fixed network 5 to each RNC under the management.

The mobile communication system in the embodiment provides, as described above, the UE connected via the NODE-B with the connection service for connecting with the fixed network 5. Owing to this service, the UE can receive the distribution data from the distribution server 1 on the fixed network 5.

The distribution server 1 is a general type of data distribution server and provides a data distribution service which follows. The embodiment restricts neither the function of the distribution server 1 nor the data distribution service provided by the distribution server 1. A scheme in the embodiment is that the distribution server 1 provides a service enabling moving picture data, which is generated and registered by a certain user, to be distributed in real time to a plurality of friends (UEs) existing in different places.

The distribution server 1 manages the moving picture data generated by a certain user and distributes this moving picture data. According to the example of FIG. 1, five users access the distribution server 1 via the mobile communication system by use of the UEs 41, 42, 43, 44 and 45, and view the moving picture data distributed from this distribution server 1 by employing the respective UEs. The mobile communication system in the embodiment enables the same scene of the moving picture data (distribution data) distributed from the distribution server 1 to be viewed at the same timing on the UEs 41, 42, 43, 44 and 45.

Each of UEs (41, 42, 43, 44 and 45) has a wireless interface function and performs the wireless communications with the NODE-B covering a communication area where the UE is located in accordance with a communication system realized by this wireless interface. Further, the UE has wireless interface protocol functions of Layer2 and Layer3 and are, owing to these functions, provided with a packet communication service from the mobile communication system in the embodiment. The embodiment does not limit such functions of the UE. The UE is enough to have the function enabling the UE to connect with the mobile communication system in the embodiment and the function enabling its user to view the moving picture data (distribution data) distributed from the distribution server 1.

Concept of Timing Synchronizing Method in Embodiment

Figure 2:
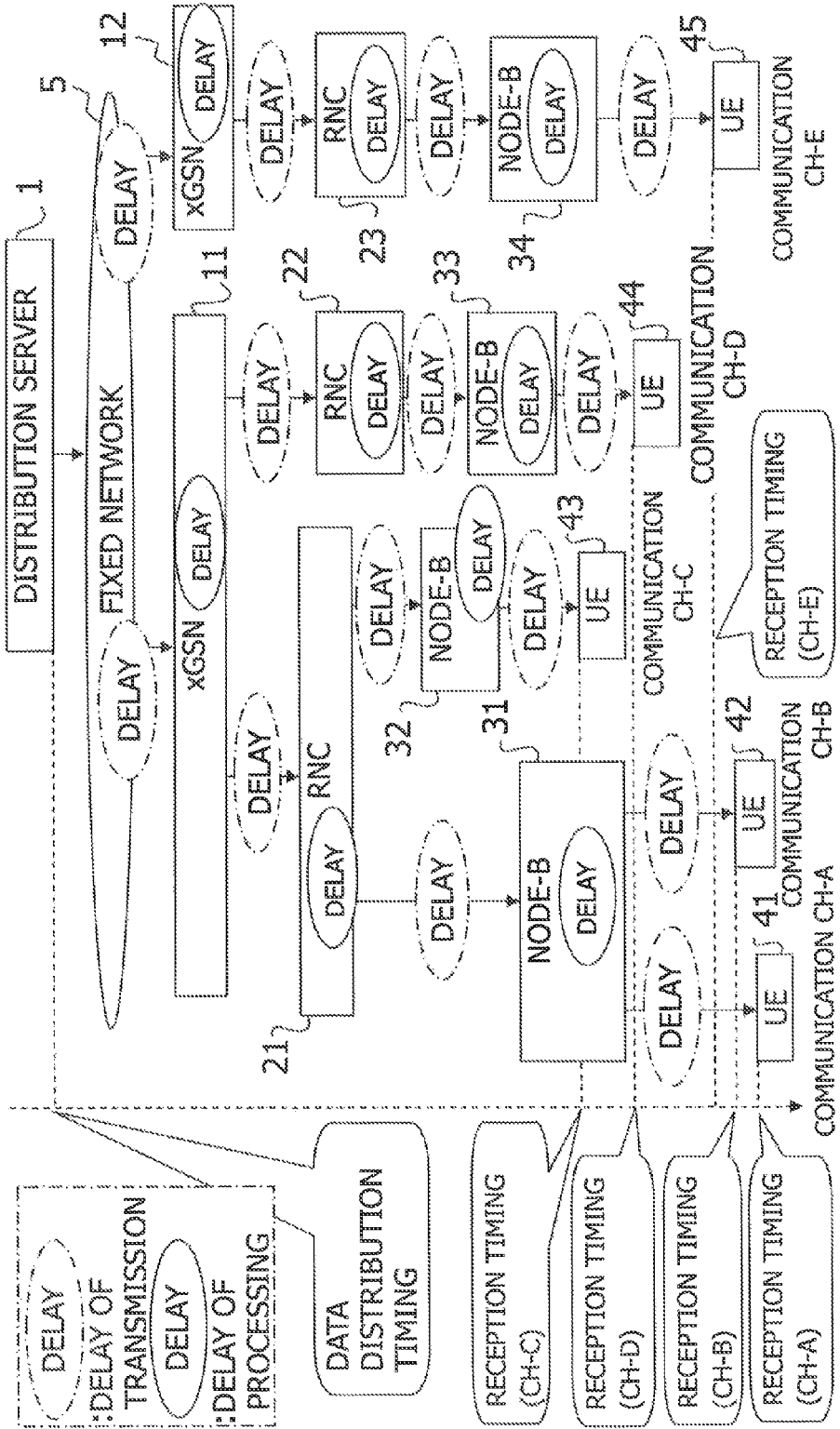
FIG. 2 is a diagram illustrating a concept of a timing synchronizing technique in the embodiment.

Before explaining the characteristic functions, related to the embodiment, of the respective nodes described above, the discussion will start with explaining a concept of a timing synchronizing method by the mobile communication system in the embodiment with reference to FIG. 2. FIG. 2 is a diagram illustrating the concept of the timing synchronizing method in the embodiment.

As already explained, in the conventional mobile communication system, when the distribution server transmits (which includes broadcasting and multicasting) to the UEs via the mobile communication system, the respective UEs receive the distribution data at different reception timings. A cause of the different timings is, as illustrated in FIG. 2, derived from differences in transmission delay time (indicated by ellipses of elongate chain lines in FIG. 2) between the respective networks through which the distribution data passes and differences in processing delay time (indicated by ellipses of solid lines in FIG. 2) between the respective nodes through which the distribution data passes. Further, the difference in the transmission delay time on each network and the difference in the processing delay time for each node are caused corresponding to a disparity in processing performance on each node, a disparity in communication performance on each network and disparities in traffic loads on the respective nodes and on the individual networks. Herein, "the processing delay time of the node" connotes a period of processing time expended after the target node has received the distribution data from the host node until the distribution data is transmitted to the managed node, and the transmission delay time in the network connotes a period of transmission time expended after the target node has transmitted to the distribution data until the managed node receives the distribution data.

In the mobile communication system of the embodiment, the distribution data distributed from the distribution server 1 is, as illustrated in FIG. 2, received at the different timings by the respective UEs 41, 42, 43, 44 and 45. In other words, an arrival timing of the same distribution data is different at the respective communication channels CH-A, CH-B, CH-C, CH-D and CH-E via which the individual UEs receive the distribution data.

For example, the reception timing of the same distribution data is different, with respect to the UE 41 (the communication channel CH-A) and the UE 42 (the communication channel CH-B), corresponding to transmission rates of the wireless communication channels CH-A and CH-B, which are utilized for the transmission from the NODE-B 31 to the UEs 41 and 42. For example, the wireless communication channels CH-A and CH-B adopt different modulation methods, and the NODE-B 31 determines which channel is utilized corresponding to an intra-cell position of the target UE. Further, with respect to the UE 41 and UE 43, the reception timing of the same distribution data is different corresponding to an amount of total time of the difference in the transmission delay between the communication from the RNC 21 to the NODE-B 31 and the communication from the RNC 21 to the NODE-B 32, the difference in the processing delay between the NODE-B 31 and the NODE-B 32 and the difference in the transmission delay between the communication channel CH-A and the communication channel CH-C.

With respect to the UE 41 and UE 44, the reception timing of the same distribution data is different corresponding to the amount of total time of the difference in the transmission delay between the communication from the xGSN 11 to the RNC 21 and the communication from the xGSN 11 to the RNC 22, the difference in the processing delay between the RNC 21 and the RNC 22, the difference in the transmission delay between the communication from the RNC 21 to the NODE-B 31 and the communication from the RNC 22 to the NODE-B 33, the difference in the processing delay between the NODE-B 31 and the NODE-B 33 and the difference in the transmission delay between the communication channel CH-A and the communication channel CH-D.

With respect to the UE 41 and UE 45, the reception timing of the same distribution data is different corresponding to the amount of total time of the difference in the transmission delay between the communication from the distribution server 1 to the xGSN 11 and the communication from the distribution server 1 to the xGSN 12 (the respective routes within the fixed network 5), the difference in the processing delay between the xGSN 11 and the xGSN 12, the difference in the transmission delay between the communication from the xGSN 11 to the RNC 21 and the communication from the xGSN 12 to the RNC 23, the difference in the processing delay between the RNC 21 and the RNC 23, the difference in the transmission delay between the communication from the RNC 21 to the NODE-B 31 and the communication from the RNC 23 to the NODE-B 34, the difference in the processing delay between the NODE-B 31 and the NODE-B 34 and the difference in the transmission delay between the communication channel CH-A and the communication channel CH-E.

The mobile communication system in the embodiment eliminates the discrepancy between the reception timings of the same distribution data in the respective UEs by absorbing the transmission delay in each network through which the distribution data passes and the processing delay in each node through which the distribution data passes.

[Configuration of Device]

The characteristic functions, related to the embodiment, of the respective nodes such as the xGSN, the RNC and the NODE-B which configure the mobile communication system in the embodiment, will hereinafter be described. Herein, the discussion will be focused on the characteristic function units related to the embodiment.

<RNC>

Figure 3:
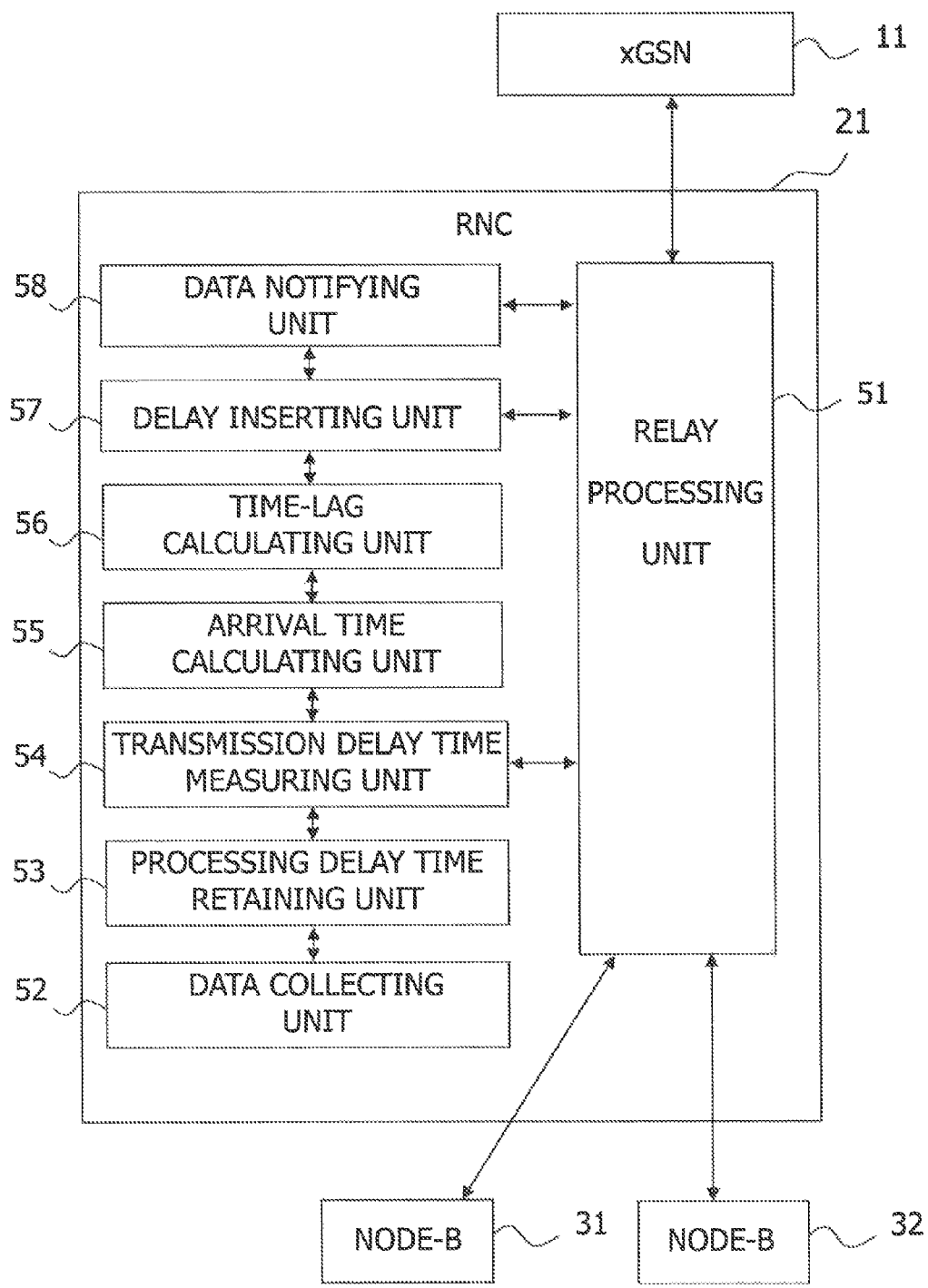
FIG. 3 is a block diagram illustrating and outline of a functional configuration of an RNC in the embodiment.

To start with, a configuration of the RNC having the host node and the managed node in the respective nodes will hereinafter be described with reference to FIG. 3. FIG. 3 is a block diagram illustrating an outline of a functional configuration of the RNC 21 in the embodiment. Each of the RNCs 21, 22 and 23 has the same functional configuration, and hence the discussion herein on the RNC will be made.

The RNC 21 includes a relay processing unit 51, a data collecting unit 52, a processing delay time retaining unit 53, a transmission delay time measuring unit 54, an arrival time calculating unit 55, a time-lag calculating unit 56, a delay inserting unit 57 and a data notifying unit 58. Among these components, the relay processing unit 51 is a function unit which executes a relay process peculiar to the RNC as described above. The relay processing unit 51 realizes the communication of the host node with the xGSN 11 and the communications of the managed nodes with the NODE-B 31 and the NODE-B 32.

The data collecting unit 52 collects each arrival time from the managed nodes onward from the NODE-B 31 and NODE-B 32 defined as managed nodes. With respect to the arrival time from the managed nodes onward, the longest arrival time after the distribution data has been received by the managed node is selected and transmitted by the managed node until the distribution data arrives at the UE. According to the example in FIG. 2, the longer arrival time of the arrival time after the NODE-B 31 has received the distribution data from the RNC 21 until the UE 41 receives the distribution data and the arrival time after the NODE-B 31 has received the distribution data from the RNC 21 until the UE 42 receives the distribution data, is transmitted from the NODE-B 31 as the arrival time from the NODE-B 31 onward. The data collecting unit 52 collects the arrival time from the NODE-B 31 onward and the arrival time from the NODE-B 32 onward according to a predetermined protocol. It should be noted that the embodiment does not restrict this predetermined protocol.

The processing delay time retaining unit 53 adjustably retains the processing delay time beforehand in a memory etc. This processing delay time may be calculated by an on-desk calculation based on the specifications of the relay processing unit 51 and may also be acquired by an actual measurement which uses a test signal. The calculation of the processing delay time by the on-desk calculation involves, for example, calculating the processing time in each of the function units (circuits) configuring the relay processing unit 51, calculating respective periods of transmission time on the communication lines which connect the function units and totalizing these periods of calculated time.

The transmission delay time measuring unit 54 measures respectively transmission delay time from the RNC 21 to the managed nodes NODE-B 31 and NODE-B 32, and retains the measured transmission delay time to the managed nodes. This transmission delay time is calculated by use of a PING command, a measurement of a phase difference, etc. In the case of PING command, the transmission delay time measuring unit 54 transmits the PING command to each managed node when starting up the system. It is to be noted that the embodiment does not restrict the technique of measuring the transmission delay time to the managed node from the target node.

The arrival time calculating unit 55 calculates the arrival time from the self-node onward (RNC) for each managed node. In other words, the arrival time calculating unit 55 calculates the arrival time for each managed node after the distribution data has been received by the self-node until the distribution data arrives at the UE via the managed node. Hereafter, each of thus-calculated arrival time is termed the arrival time from the self-node onward with respect to each managed node. For instance, the arrival time from the RNC 21 onward with respect to the NODE-B 31 connotes the arrival time from the RNC 21 onward on the route via the NODE-B 31. Herein, the arrival time calculating unit 55 calculates the arrival time from the RNC 21 onward with respect to each of the NODE-B 31 and the NODE-B 32.

For example, the arrival time calculating unit 55 acquires the arrival time from the RNC 21 onward with respect to the NODE-B 31 by further adding the arrival time from the NODE-B 31 onward that is collected by the data collecting unit 52 to the total time of the processing delay time retained by the processing delay time retaining unit 53 and the transmission delay time to the NODE-B 31 that is retained by the transmission delay time measuring unit 54. Similarly, the arrival time calculating unit 55 calculates the arrival time from the RNC 21 onward with respect to the NODE-B 32 by further adding the arrival time from the NODE-B 32 onward that is collected by the data collecting unit 52 to the total time of the processing delay time and the transmission delay time to the NODE-B 32. The arrival time calculating unit 55 retains the thus-calculated arrival time from the RNC 21 onward with respect to each managed node.

The time-lag calculating unit 56 determines, as criterial arrival time, the longest arrival time from the RNC 21 onward with respect to the respective managed nodes, which is calculated by the arrival time calculating unit 55, and calculates a difference between this criterial arrival time and each arrival time. According to the example in FIG. 2, the time-lag calculating unit 56 determines, as the criterial arrival time, the arrival time from the RNC 21 onward with respect to the NODE-B 31, and calculates a difference (time-lag) between the arrival time from the RNC 21 onward with respect to the NODE-B 31 and the arrival time from the RNC 21 onward with respect to the NODE-B 32. The time-lag calculating unit 56 transmits items of information, on the managed node (NODE-B 31) embraced by the route, which organize the calculated time-lag and the criterial arrival time, to the delay inserting unit 57.

The delay inserting unit 57 controls, based on the time-lag sent from the time-lag calculating unit 56, a transmission timing of the distribution data to the predetermined managed node. The delay inserting unit 57 adds a delay to the transmission timing so that the arrival time from the self-node onward becomes the same in the case of passing through every managed node. According to the example in FIG. 2, the delay inserting unit 57, on the occasion of transmitting the distribution data to the NODE-B 32, delays the transmission timing to a degree corresponding to the time-lag sent from the time-lag calculating unit 56. On the other hand, the delay inserting unit 57 does not add any delay to the transmission timing of the distribution data to the managed node (NODE-B 31) embraced by the route, which organizes the criterial arrival time. Note that the addition of the delay can be realized by a technique such as buffering the distribution data during the delay time. The embodiment does not limit the delay adding technique.

The data notifying unit 58 instructs the relay processing unit 51 to notify the xGSN 11 of the criterial arrival time determined by the time-lag calculating unit 56 as the arrival time from the RNC 21 onward.

<NODE-B>

Figure 4:
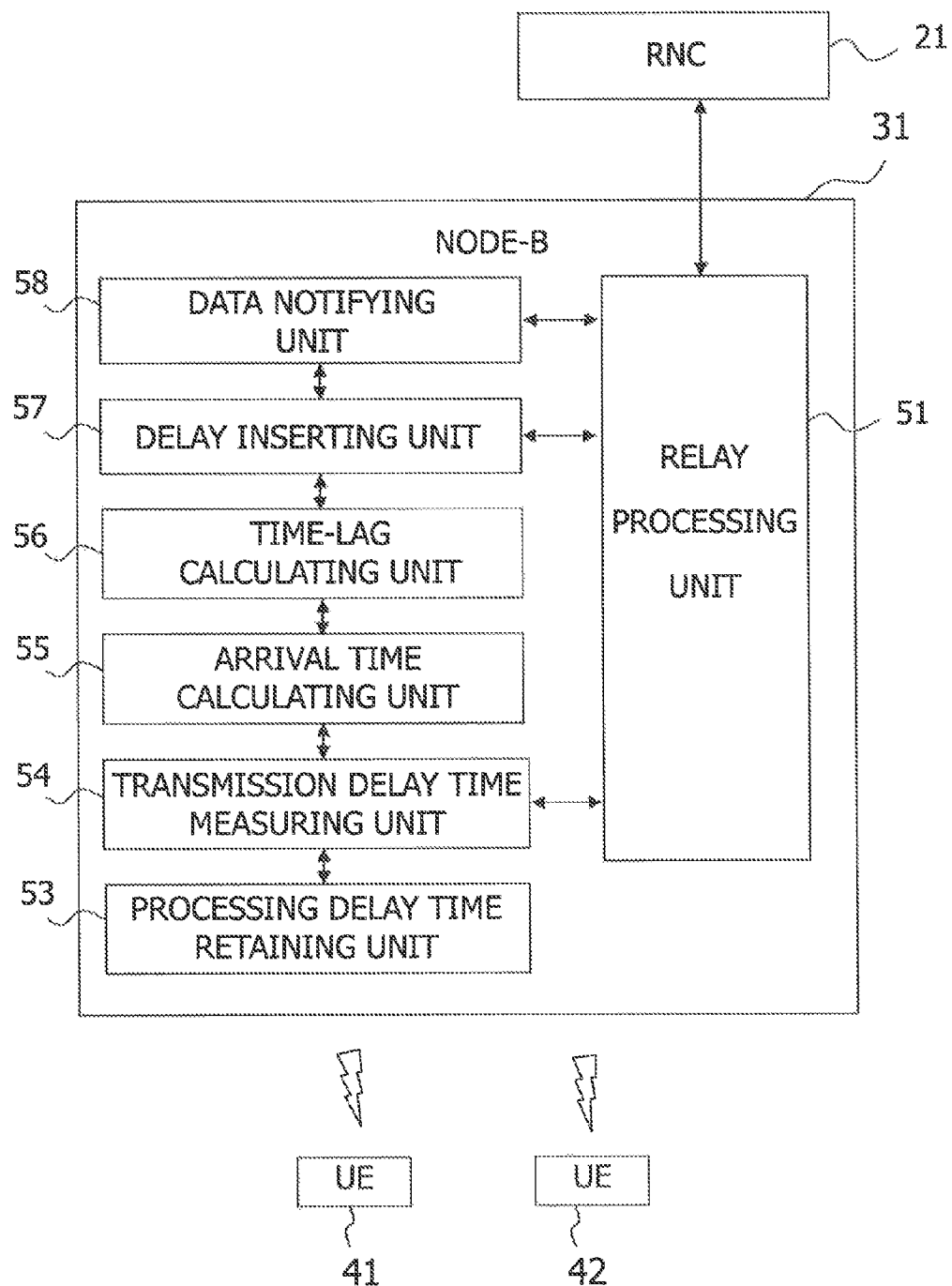
FIG. 4 is a block diagram illustrating an outline of a functional configuration of a NODE-B in the embodiment.

Next, a configuration of the NODE-B having not the managed node but the host node will hereinafter be described with reference to FIG. 4. FIG. 4 is a block diagram illustrating an outline of a functional configuration of the NODE-B 31 in the embodiment. The NODE-B 31, the NODE-B 32, the NODE-B 33 and the NODE-B 34 have the same functional configuration, and hence the discussion herein on the NODE-B 31 will be made.

The NODE-B 31 has none of the managed node and does not therefore include the data collecting unit 52 in the functional configuration of the RNC 21 described above. The functional configuration of the NODE-B 31 other than this is the same as that of the RNC 21 except an arrangement that the target node is replaced by the NODE-B and the host node is replaced by the RNC 21. Only the function units executing the processes different from those of the RNC 21 will hereinafter be explained.

The relay processing unit 51 is a function unit which executes the relay process peculiar to the NODE-B as described above. The relay processing unit 51 realizes the communication with the RNC 21 serving as the host node and the communications with the UEs 41 and 42 located within the cell.

The transmission delay time measuring unit 54 measures the transmission delay time from the NODE-B 31 to each of the UEs 41 and 42, and retains the measured transmission delay time to each UE. This transmission delay time may be measured by use of a predetermined radio signal and may also be calculated based on a transmission rate, a transmission frame interval, etc, which are allocated to each UE by a scheduler etc within the relay processing unit 51. The embodiment does not restrict the technique of measuring the transmission delay time from the NODE-B to the UE.

The arrival time calculating unit 55 calculates each arrival time after the distribution data has been received by the NODE-B 31 until the distribution data arrives at each of the UEs 41 and 42 (which will hereinafter be referred to as the arrival time of the UE). Specifically, the arrival time calculating unit 55 obtains the arrival time of the UE 41 by adding the processing delay time retained by the processing delay time retaining unit 53 and the transmission delay time to the UE 41 that is retained by the transmission delay time measuring unit 54. Similarly, the arrival time calculating unit calculates the arrival time of the UE 42 by adding the processing delay time and the transmission delay time to the UE 42.

The time-lag calculating unit 56 determines, as the criterial arrival time, the longest arrival time of the UE that is calculated by the arrival time calculating unit 55, and calculates a difference between this criterial arrival time and each arrival time. According to the example in FIG. 2, the time-lag calculating unit 56 determines the arrival time of the UE 41 as the criterial arrival time, and calculates the difference (time-lag) between the arrival time of the UE 41 and the arrival time of the UE 42. The time-lag calculating unit 56 transmits the items of information on the target UE 41 with respect to the calculated time-lag and criterial arrival time to the delay inserting unit 57.

The delay inserting unit 57 controls, based on the time-lag sent from the time-lag calculating unit 56, the transmission timing of the distribution data to the predetermined UE. The delay inserting unit 57 adds the delay to the transmission timing of the distribution data so that the periods of arrival time of all the UEs become the same. According to the example in FIG. 2, the delay inserting unit 57, on the occasion of transmitting the distribution data to the UE 42, delays the transmission timing to a degree corresponding to the time-lag sent from the time-lag calculating unit 56.

The data notifying unit 58 instructs the relay processing unit 51 to notify the RNC 21 of the criterial arrival time determined by the time-lag calculating unit 56 as the arrival time from the NODE-B 31 onward.

<xGSN>

Figure 5:
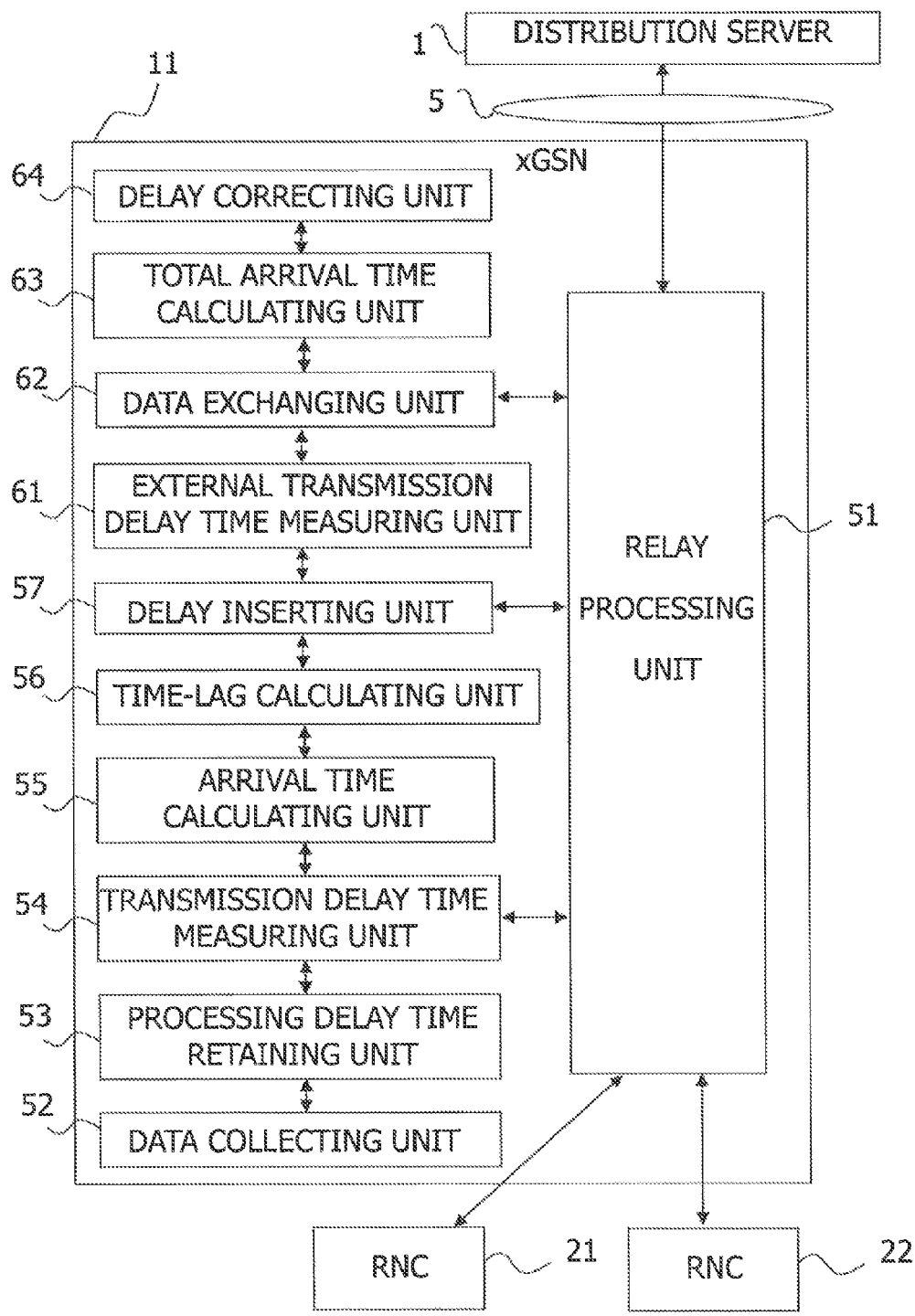
FIG. 5 is a block diagram illustrating an outline of a functional configuration of an xGSN in the embodiment.

Next, a configuration of the xGSN having not the host node but the managed node will hereinafter be described with reference to FIG. 5. FIG. 5 is a block diagram illustrating an outline of the functional configuration of the xGSN 11 in the embodiment. The xGSN 11 and the xGSN 12 have the same functional configuration, and therefore the discussion herein on the xGSN 11 will be made.

The xGSN 11 has none of the host node and does not therefore include the data notifying unit 58 in the RNC 21 described above but includes, instead, an external transmission delay time measuring unit 61, a data exchange unit 62, a total arrival time calculating unit 63 and a delay correcting unit 64 as new components. The functional configuration of the xGSN 11 other than this is the same as that of the RNC 21 except an arrangement that the target node is replaced by the xGSN 11 and the managed nodes are replaced by the RNCs 21 and 22. The same function units as those of the RNC 21 described above will hereinafter be briefly explained, and in-depth descriptions of the function units executing the processes different from those of the RNC 21 will be made.

The relay processing unit 51 is the function unit which executes the relay process peculiar to the xGSN as described above. The relay processing unit 51 actualizes the communication with another xGSN (xGSN 12) and the communications with the managed nodes RNC 21 and RNC 22. The data collecting unit 52 collects the arrival time from the RNC 21 onward and the arrival time from the RNC 22 onward by using a predetermined protocol. The transmission delay time measuring unit 54 measures the periods of transmission delay time from the xGSN 11 to the managed nodes RNC 21 and RNC 22, and retains the thus-measured transmission delay time to each managed node.

The arrival time calculating unit 55 calculates the arrival time from the xGSN 11 onward with respect to the RNC 21 and the arrival time from the xGSN 11 onward with respect to the RNC 22. The time-lag calculating unit 56, according to the example in FIG. 2, determines, as the criterial arrival time, the arrival time from the xGSN 11 onward with respect to the RNC 21, and calculates the difference (time-lag) between the arrival time from the xGSN 11 onward with respect to the RNC 21 and the arrival time from the xGSN 11 onward with respect to the RNC 22. The delay inserting unit 57, according to the example in FIG. 2, adds the delay, corresponding to the time-lag sent from the time-lag calculating unit 56, to the transmission timing when transmitting the distribution data to the RNC 22.

The external transmission delay time measuring unit measures the transmission delay time between the predetermined server (distribution server 1) connecting with the fixed network 5 to which the xGSN 11 is connected and the xGSN 11. In other words, the external transmission delay time measuring unit 61 measures the transmission delay time after the distribution data has been transmitted by the distribution server 1 until the distribution data arrives at the xGSN 11. This transmission delay time may be measured by using the PING command, the measurement of the phase difference, etc, and a value in design may also be previously retained. The embodiment does not restrict the technique of measuring the transmission delay time by this external transmission delay time measuring unit 61.

The data exchange unit 62 instructs the relay processing unit 51 to transmit, to another xGSN (xGSN 12), the longer arrival time (the criterial arrival time determined by the time-lag calculating unit 56) of the arrival time from the xGSN 11 onward with respect to the RNC 21 that is calculated by the arrival time calculating unit 55 and the arrival time from the xGSN 11 onward with respect to the RNC 22, and transmit the transmission delay time from the distribution server 1 to the xGSN 11 that is measured by the external transmission delay time measuring unit 61. Further, the data exchange unit 62 receives the information transmitted from another xGSN and received by the relay processing unit 51. According to the example in FIG. 2, the data exchange unit 62 receives the arrival time from the xGSN 12 onward with respect to the RNC 23 and the transmission delay time from the distribution server 1 to the xGSN 12, which are transmitted from the xGSN 12.

The total arrival time calculating unit 63 calculates total arrival time after the distribution data has been transmitted by the distribution server 1 until the distribution data arrives at each UE with respect to each xGSN through which the distribution data passes. The total arrival time with respect to the self-node (xGSN 11) is calculated by adding the transmission delay time from the distribution server 1 to the xGSN 11 that is measured by the external transmission delay time measuring unit 61 to the criterial arrival time determined by the time-lag calculating unit 56. The total arrival time with respect to another node (xGSN 12) is calculated by adding the transmission delay time from the distribution server 1 to another node, which is similarly received, to the criterial arrival time with respect to another node that is received by the data exchange unit 62. According to the example in FIG.

2, the total arrival time calculating unit 63 calculates the total arrival time related to the xGSN 11 and the total arrival time related to the xGSN 12.

Further, the total arrival time calculating unit 63 determines, as the criterial arrival time, the longest total arrival time in the thus-calculated periods of total arrival time with respect to the xGSNs, and calculates a difference between the criterial arrival time and each total arrival time. The total arrival time calculating unit 63 transmits the thus-calculated arrival time difference to the delay correcting unit 64.

The delay correcting unit 64 corrects, based on the arrival time difference sent from the total arrival time calculating unit 63, the delay added by the delay inserting unit 57. The delay correcting unit 64 corrects the delay so as to equalize (synchronize) the reception timings of the distribution data transmitted to the respective UEs from the distribution server 1. For example, when the delay inserting unit 57 adds the delay to the distribution data transmitted to the RNC 22, this delay time is further increased, and the increased delay time is added also to the distribution data transmitted to the RNC 21. Further, in the case of not adding the delay, if such a necessity arises as to newly add a delay corresponding to the arrival time difference transmitted from the total arrival time calculating unit 63, a new delay is added.

Operational Example

Figure 6:
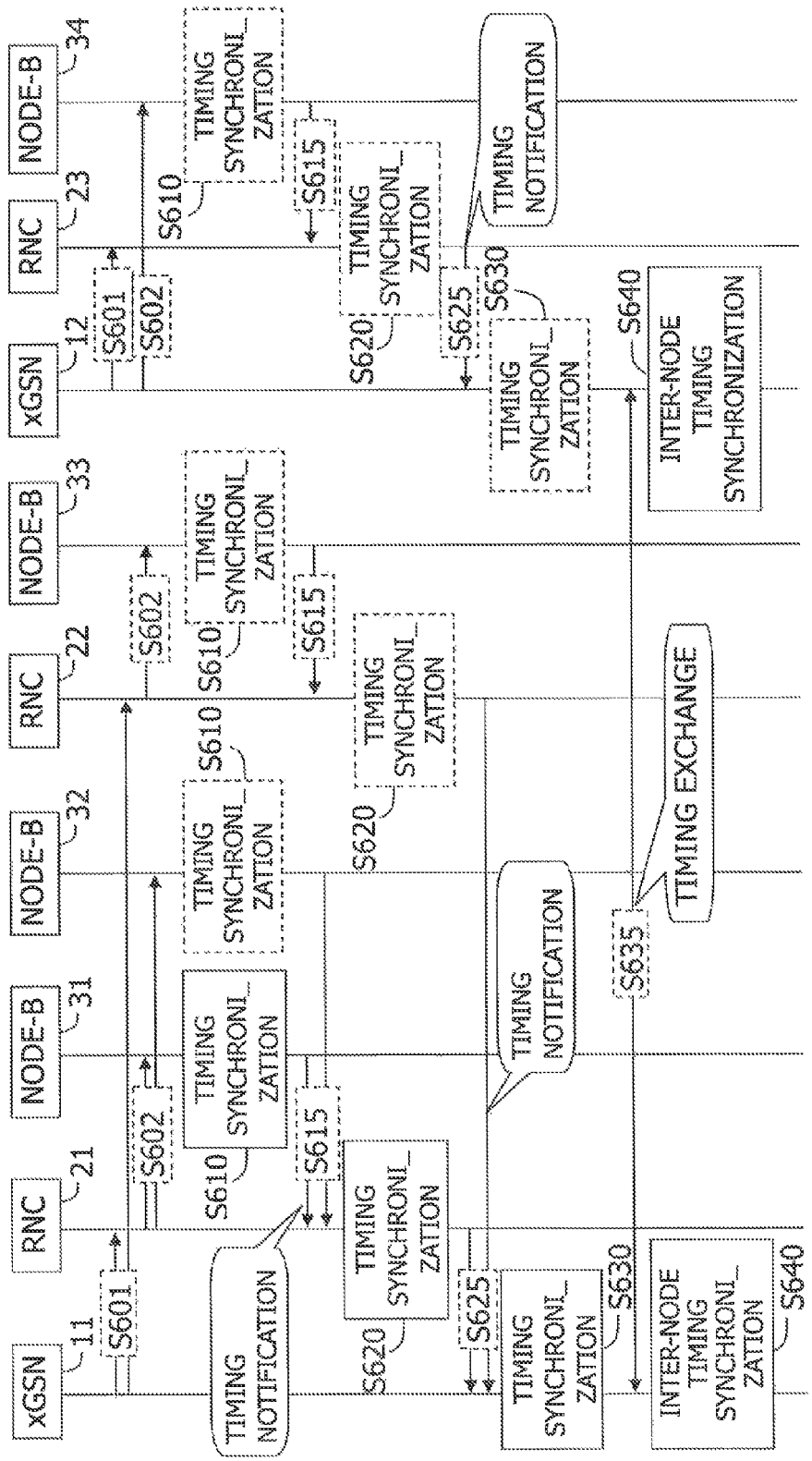
FIG. 6 is a sequence chart illustrating an operational example of the mobile communication system in the embodiment.
Figure 7:
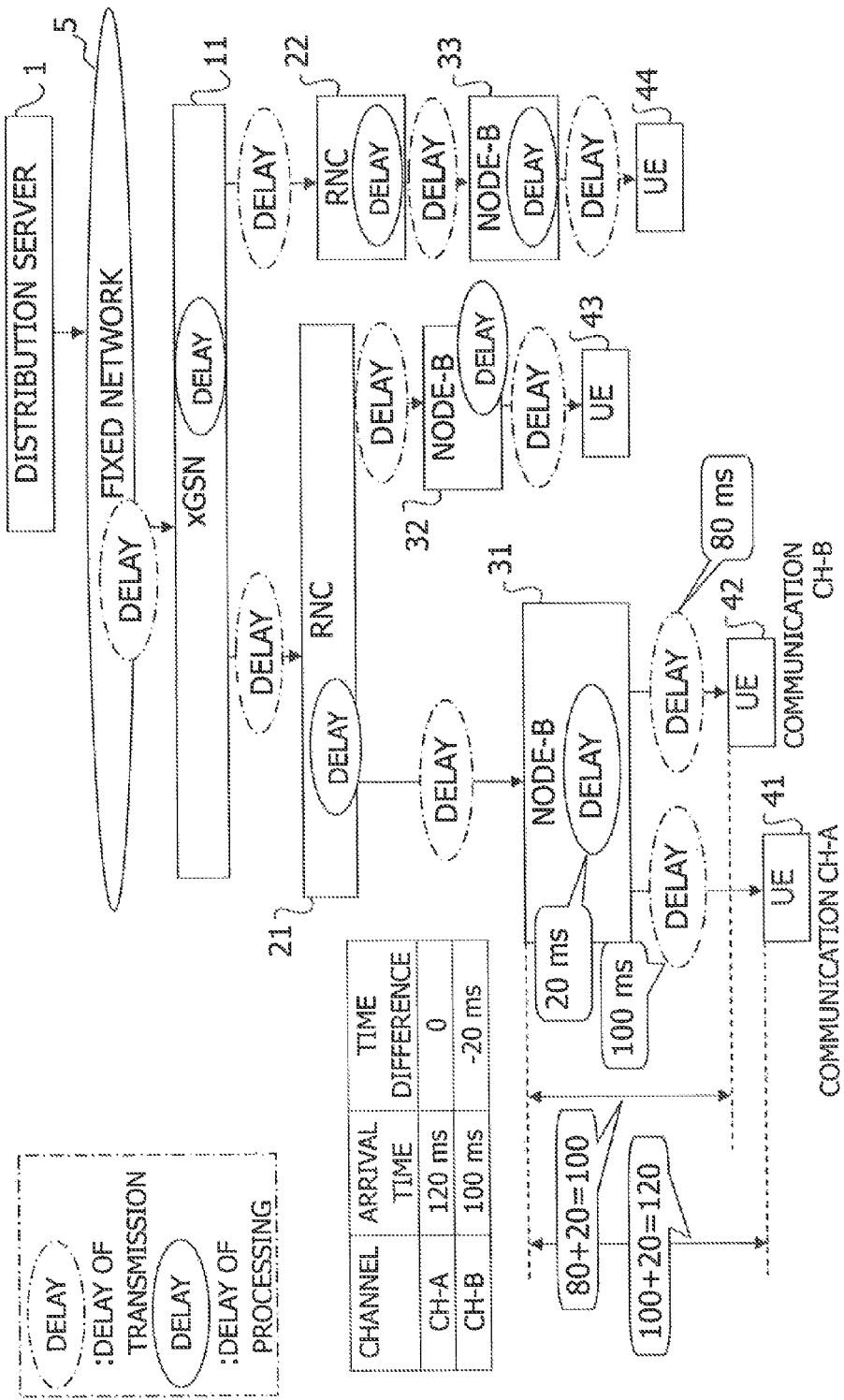
FIG. 7 is a diagram schematically illustrating an operation of the NODE-B 31 in the operation sequence in FIG. 6.

Next, an operational example of the mobile communication system in the embodiment will hereinafter be described based on the example in FIG. 2 with reference to FIGS. 6 through 16. A case taken as a premise has a system architecture, in which the UEs 41, 42, 43, 44 and 45 are connected respectively to the NODE-B(s) 31, 32, 33 and 34, the distribution server 1 distributes the distribution data to the respective UEs, and there is a possibility that the reception timings of the distribution data at the UEs might be different as in the example of FIG. 2. FIG. 6 is a sequence chart illustrating the operational example of the mobile communication system in the embodiment. FIGS. 7 through 16 are diagrams each schematically depicting operations of the individual nodes in the operation sequence in FIG. 6.

As illustrated in FIG. 6, on the occasion of executing the timing synchronizing process, each of the nodes in the mobile communication system measures the transmission delay time between the self-node and each of the managed nodes (the transmission delay time measuring unit 54). For example, the xGSN 11 measures the transmission delay time to each of the RNCs 21 and 22 by use of the PING, etc., and the xGSN 12 measures the transmission delay time to the RNC 23 (S601). Similarly, the RNC 21 measures the transmission delay time to each of the NODE-B 31 and the NODE-B 32, the RNC 22 measures the transmission delay time to the NODE-B 33, and the RNC 23 measures the transmission delay time to the NODE-B 34 (S602). Moreover, though not illustrated in FIG. 6, the xGSNs 11 and 12 respectively measure and retain the transmission delay time from the distribution server 1 to the respective xGSNs (the external transmission delay time measuring unit 61). Further, the NODE-B(s) 31, 32, 33 and 34 respectively measure and retain the transmission delay time to the individual UEs on the basis of the wireless resources allocated to the UEs (the transmission delay time measuring unit 54). Each node retains the measured transmission delay time. Each node retains the processing delay time of the self-node (the processing delay time retaining unit 53).

When each node retains the transmission delay time, each NODE-B defined as the lowest-order node executes the timing synchronizing process (S610). In the example of the configuration in the embodiment, however, only one UE is connected to each of the NODE-B(s) 32, 33 and 34, and hence there is no necessity for taking the timing synchronization. Such being the case, the timing synchronizing process of the NODE-B 31 will hereinafter be described with reference to FIGS. 7 and 8.

In the NODE-B 31, the transmission delay time measuring unit 54 measures and retains the transmission delay time on the transmission path on the basis of the communication channel A (CH-A) allocated to the UE 41 and the communication channel B (CH-B) allocated to the UE 42, respectively. For example, the transmission delay time to the UE 41 is on the order of 100 milliseconds (ms), and the transmission delay time to the UE 42 is 80 ms. The processing delay time retaining unit 53 retains the processing delay time on the order of 20 ms.

The arrival time calculating unit 55 of the NODE-B 31 calculates, based on these retained items of information, the arrival time of each of the UEs 41 and 42. Herein, the arrival time of the UE 41 is calculated into 120 ms (=100+20), and the arrival time of the UE 42 is calculated into 100 ms (=80+20).

Through this calculation, the time-lag calculating unit 56 determines the arrival time of the UE 41 as the criterial arrival time. This is because the arrival time of the UE 41 is longer than the arrival time of the UE 42. The time-lag calculating unit 56 calculates, as the time-lag, a value (20 ms) obtained by subtracting the arrival time of the UE 42 from the criterial arrival time (120 ms).

Figure 8:
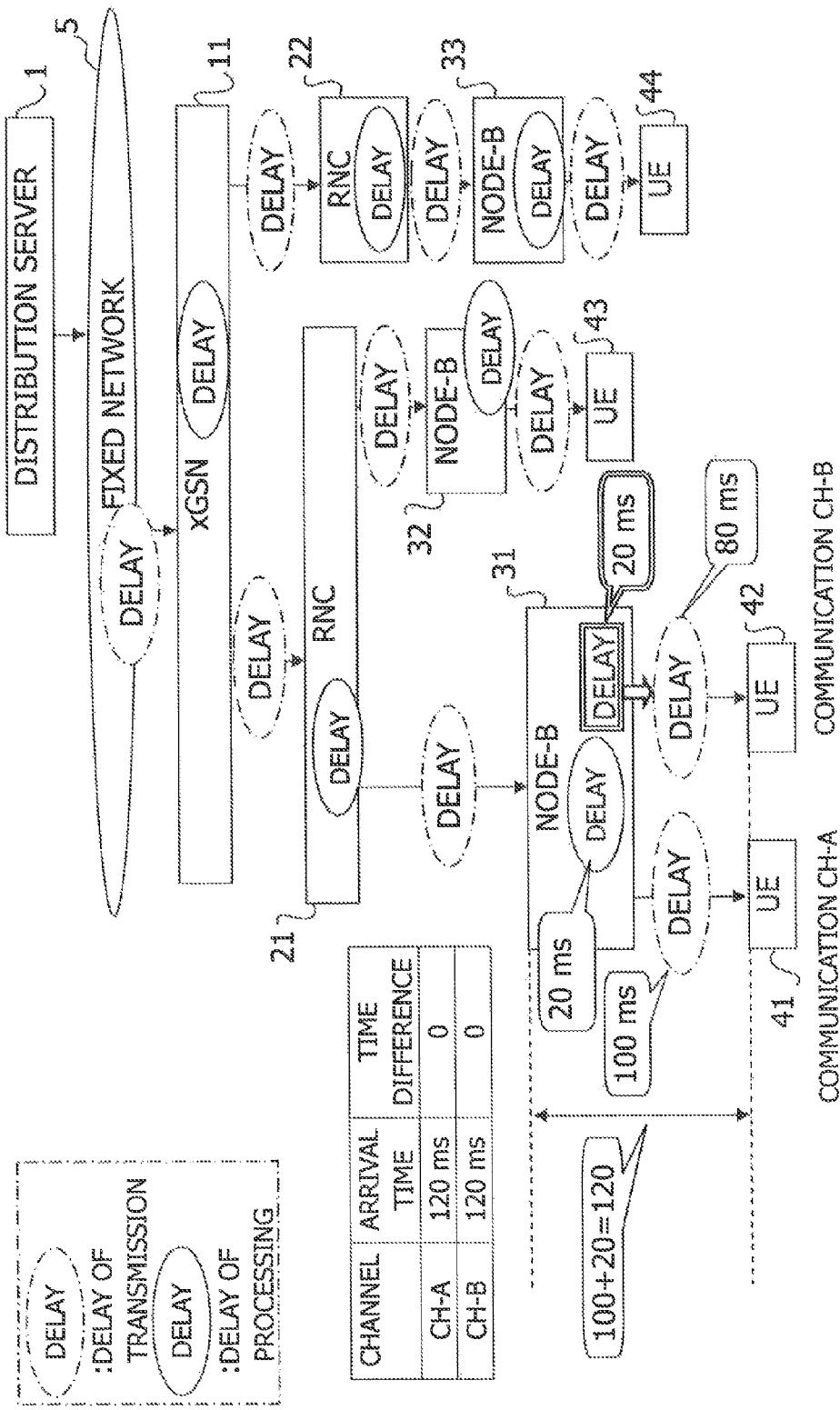
FIG. 8 is a diagram schematically illustrating the operation of the NODE-B 31 in the operation sequence in FIG. 6.

The delay inserting unit 57 adds, as illustrated in FIG. 8, the time-lag (20 ms) calculated by the time-lag calculating unit 56 as a delay when transmitting the distribution data to the UE 42. In other words, the delay inserting unit 57 delays the transmission of the distribution data to each UE to a degree corresponding to this time-lag (time difference) so as to equalize the arrival time at the individual UEs.

With this contrivance, it follows that the periods after the NODE-B 31 has received the distribution data until the distribution data has been received by the UEs 41 and 42, are synchronized.

Figure 9:
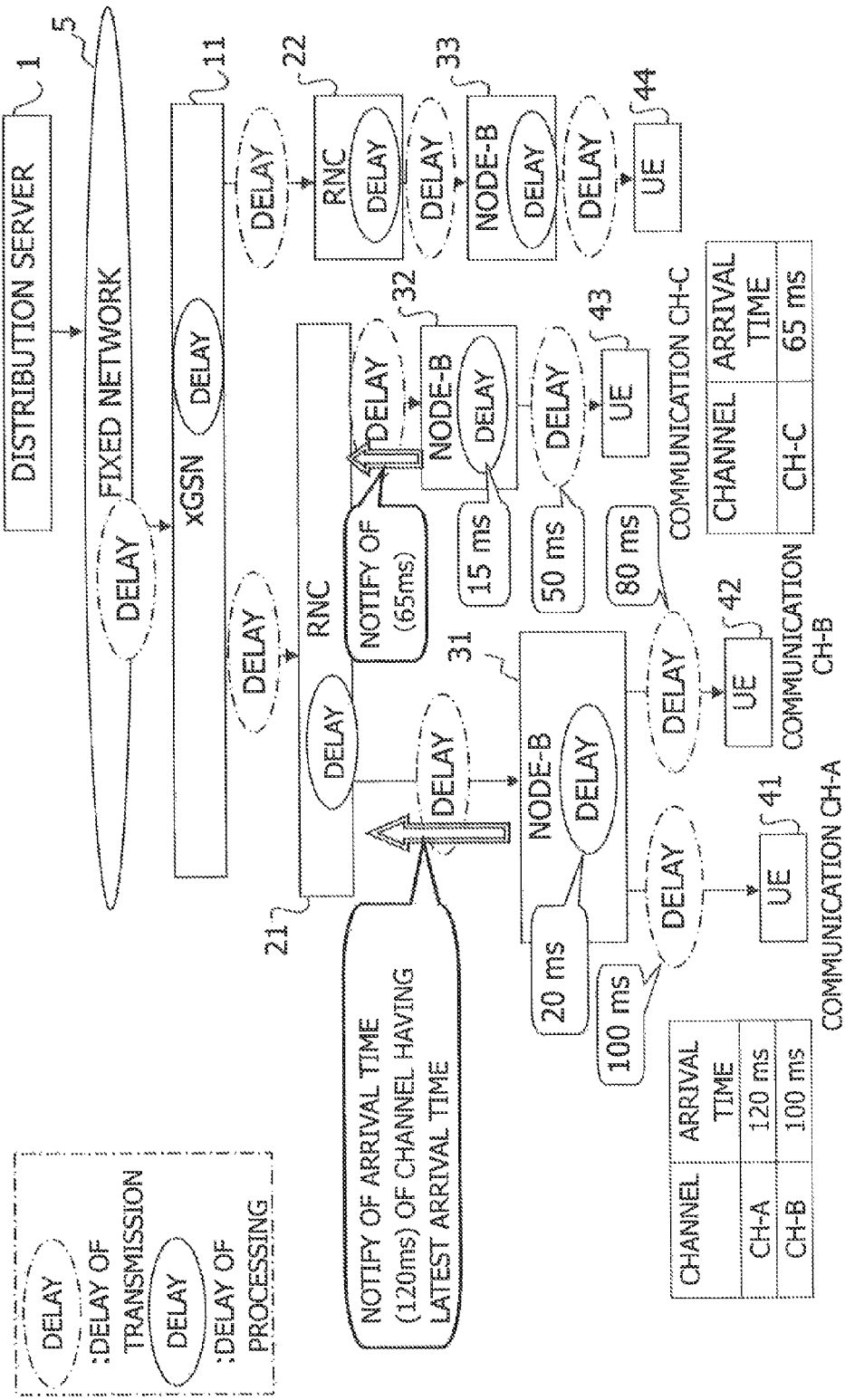
FIG. 9 is a diagram schematically illustrating the operations of the NODE-B 31 and the NODE-B 32 in the operation sequence in FIG. 6.
Figure 10:
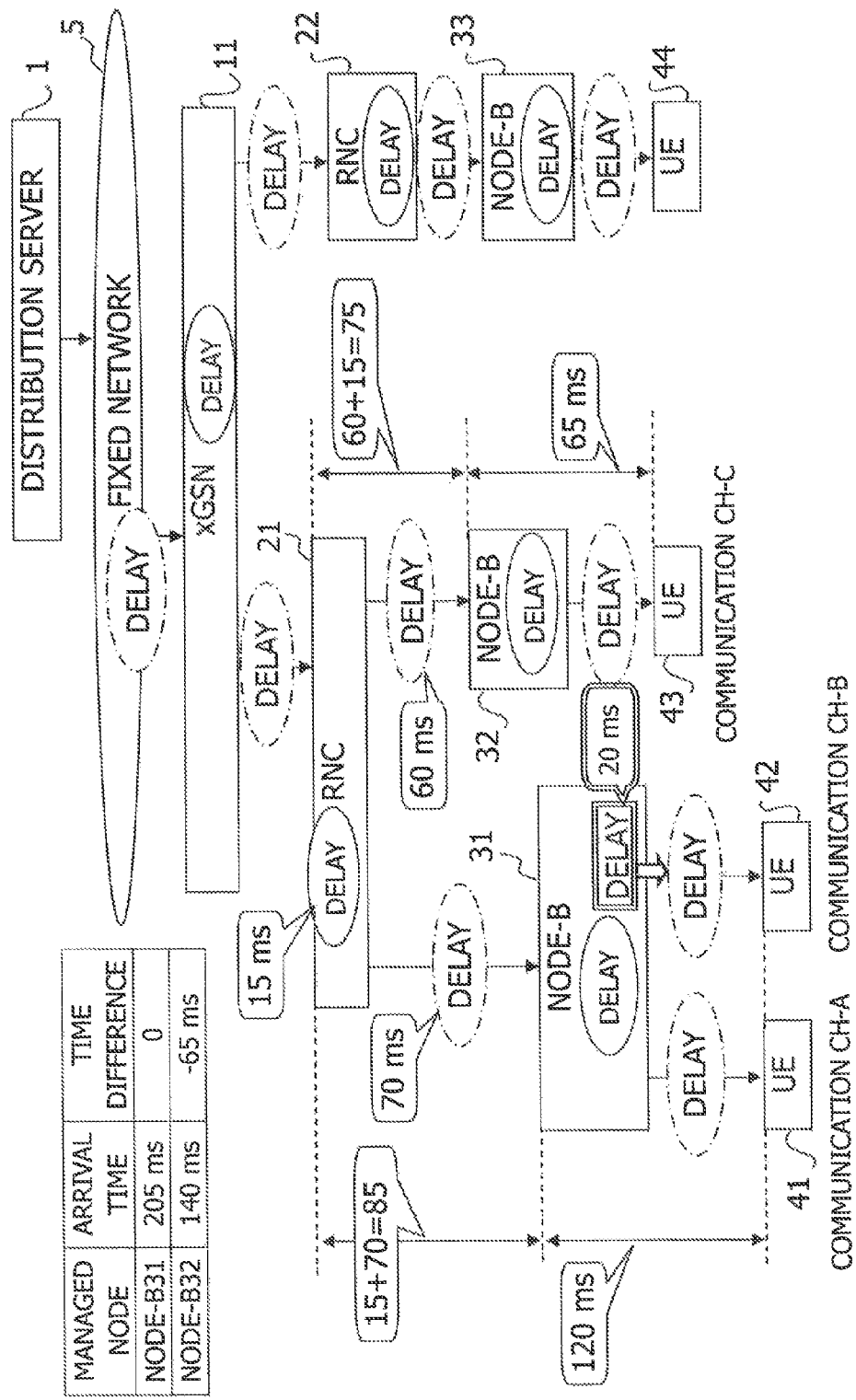
FIG. 10 is a diagram schematically illustrating an operation of the RNC 21 in the operation sequence in FIG. 6.

After this timing synchronizing process, as illustrated in FIG. 9, the NODE-B 31 notifies the RNC 21 serving as the host node of the criterial arrival time (120 ms) determined by the time-lag calculating unit 56 as the arrival time from the NODE-B 31 onward (S615). The determination of the criterial arrival time involves using the longest arrival time in the periods of arrival time at the individual UEs when the plurality of UEs is connected to the NODE-B. On the other hand, because of the NODE-B 32 being connected to only the UE 43, the arrival time at the UE 43 is calculated, and the RNC 21 is notified of this arrival time as the arrival time from the NODE-B 32 onward (S615). In the NODE-B 32 illustrated in FIG. 9, a value (65 ms) obtained by adding the processing delay time (15 ms) to the transmission delay time (50 ms) to the UE 43 is calculated as the arrival time at the UE 43, and the RNC 21 is notified of this calculated value. Also in the NODE-B 33 and the NODE-B 34 connected to other RNCs, similarly to the NODE-B 32, each host node is notified of the arrival time at the UE to be connected (S615).

When the NODE-B executes the timing synchronizing process and transmits a piece of timing notification, next each RNC executes the timing synchronizing process (S620). According to the example of the configuration in the embodiment, only one NODE-B is connected to each of the RNCs 22 and 23, and hence there is no necessity for taking the timing synchronization. Such being the case, the timing synchronizing process in the RNC 21 will hereinafter be described with reference to FIGS. 10 and 11.

In the RNC 21, the transmission delay time measuring unit 54 retains the transmission delay time (70 ms) to the NODE-B 31 and the transmission delay time (60 ms) to the NODE-B 32, and the processing delay time retaining unit 53 retains the processing delay time (15 ms). Further, the data collecting unit 52 collects and retains the arrival time (120 ms) from the NODE-B 31 onward and the arrival time (65 ms) from the NODE-B 32 onward.

The arrival time calculating unit 55 of the RNC 21 calculates, based on the these retained items of information, the arrival time from the RNC 21 onward with respect to the NODE-B 31 and the arrival time from the RNC 21 onward with respect to the NODE-B 32. Herein, the arrival time from the RNC 21 onward with respect to the NODE-B 31 becomes a period of time (205 ms=(120+70+15)) obtained by adding the transmission delay time (70 ms) to the NODE-B 31 and the processing delay time (15 ms) to the arrival time (120 ms) from the NODE-B 31 onward, and the arrival time from the RNC 21 onward with respect to the NODE-B 32 becomes a period of time (140 ms=(65+60+15)) obtained by adding the transmission delay time (60 ms) to the NODE-B 32 and the processing delay time (15 ms) to the arrival time (65 ms) from the NODE-B 32 onward.

The time-lag calculating unit 56 determines, as the criterial arrival time, the longest arrival time among the periods of arrival time from the RNC 21 onward with respect to the individual managed nodes. Herein, the arrival time (205 ms) from the RNC 21 onward in regard to the NODE-B 31 is determined as the criterial arrival time. The time-lag calculating unit 56 calculates, as the time-lag, the value (65 ms) obtained by subtracting the arrival time (140 ms) from the RNC 21 onward with respect to the NODE-B 32 from the criterial arrival time (205 ms).

Figure 11:
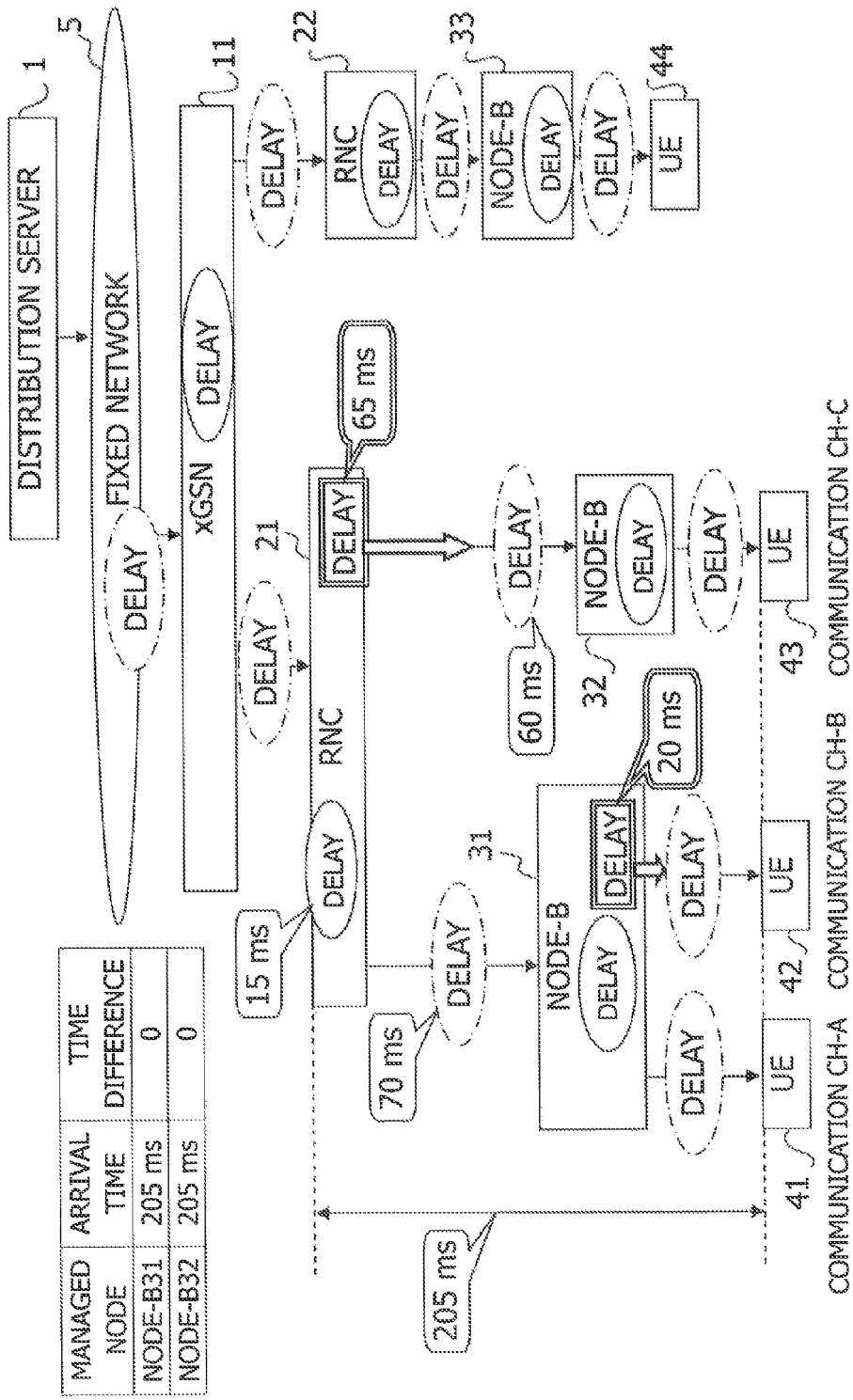
FIG. 11 is a diagram schematically illustrating the operation of the RNC 21 in the operation sequence in FIG. 6.

The delay inserting unit 57 adds, as a delay, the time-lag (65 ms) calculated by the time-lag calculating unit 56 when transmitting the distribution data to the NODE-B 32. With this addition, as illustrated in FIG. 11, it follows that the periods of time till the distribution data is received by the UEs 41, 42 and 43 since the distribution data has been received by the RNC 21, are synchronized.

Figure 12:
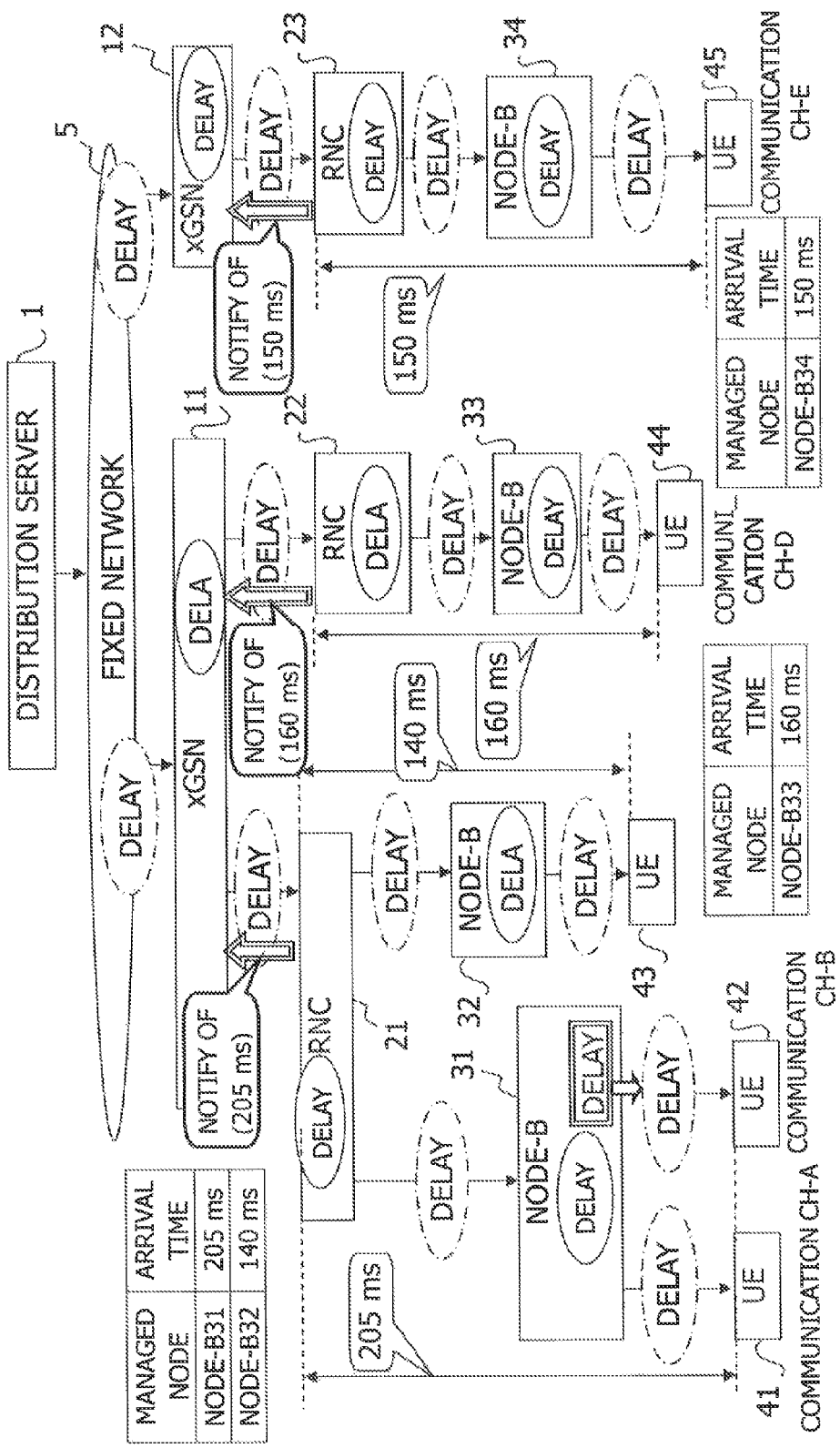
FIG. 12 is a diagram schematically illustrating the operations of the RNCs 21, 22 and 23 in the operation sequence in FIG. 6.
Figure 13:
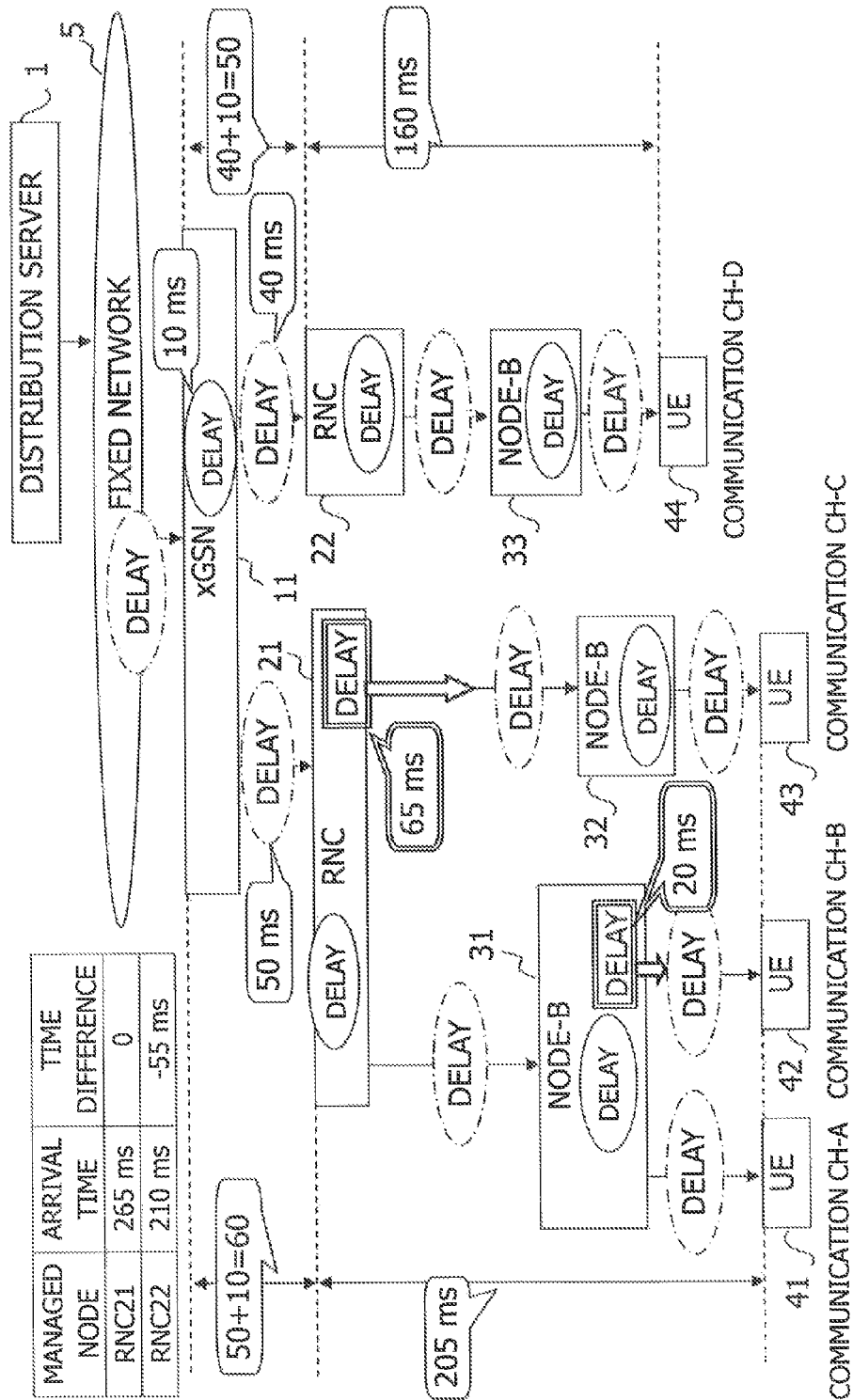
FIG. 13 is a diagram schematically illustrating the operation of the xGSN 11 in the operation sequence in FIG. 6.

After the timing synchronizing process such as this, the RNC 21 notifies the host node, i.e., the xGSN 11 of the criterial arrival time (205 ms) determined by the time-lag calculating unit 56 as the arrival time from the RNC 21 onward (S625) (see FIG. 12). The determination of the criterial arrival time involves using, when the plurality of NODE-B(s) is connected to the RNC, the longest arrival time among the periods of arrival time from the RNC 21 onward in regard to the respective nodes NODE-B. On the other hand, because of the RNC 22 being connected to only the NODE-B 33, the arrival time from the RNC 22 onward is calculated in regard to the NODE-B 33, and the xGSN 11 is notified of this arrival time (S625). In the RNC illustrated in FIG. 12, the xGSN 11 is notified of the arrival time (160 ms) from the RNC 22 onward with respect to NODE-B 33. Also in the RNC 23 connected to another xGSN 12, similarly to the RNC 22, the xGSN 12 is notified of the arrival time (150 ms) from the RNC 23 onward in regard to the NODE-B 34 (S625).

When executing the timing synchronizing process and transmitting the timing notification in the RNC, subsequently the timing synchronizing process is executed in each xGSN (S630). Only the RNC 23 is connected to the xGSN 12, and hence there is no necessity for taking the timing synchronization. Such being the case, the timing synchronizing process in the xGSN 11 will hereinafter be explained with reference to FIGS. 13 through 16.

In the xGSN 11, the transmission delay time measuring unit 54 retains the transmission delay time (50 ms) to the RNC 21 and the transmission delay time (40 ms) to the RNC 22, and the processing delay time retaining unit 53 retains the processing delay time (10 ms). Further, the data collecting unit 52 collets, from the RNCs 21 and 22, the arrival time (205 ms) from the RNC 21 onward and the arrival time (160 ms) from the RNC 22 onward, and retains these periods of arrival time.

The arrival time calculating unit 55 of the xGSN 11 calculates, based on these retained items of information, the arrival time (265 ms=(205+50+10)) from the xGSN 11 onward with respect to RNC 21 and the arrival time (210 ms=(160+40+10)) from the xGSN 11 onward with respect to RNC 22.

The time-lag calculating unit 56 determines the arrival time (265 ms) from the xGSN 11 onward as the criterial arrival time. The time-lag calculating unit 56 calculates, as the time-lag, a value (55 ms) obtained by subtracting the arrival time (210 ms) from the xGSN 11 onward in regard to the RNC 22 from the criterial arrival time (265 ms).

Figure 14:
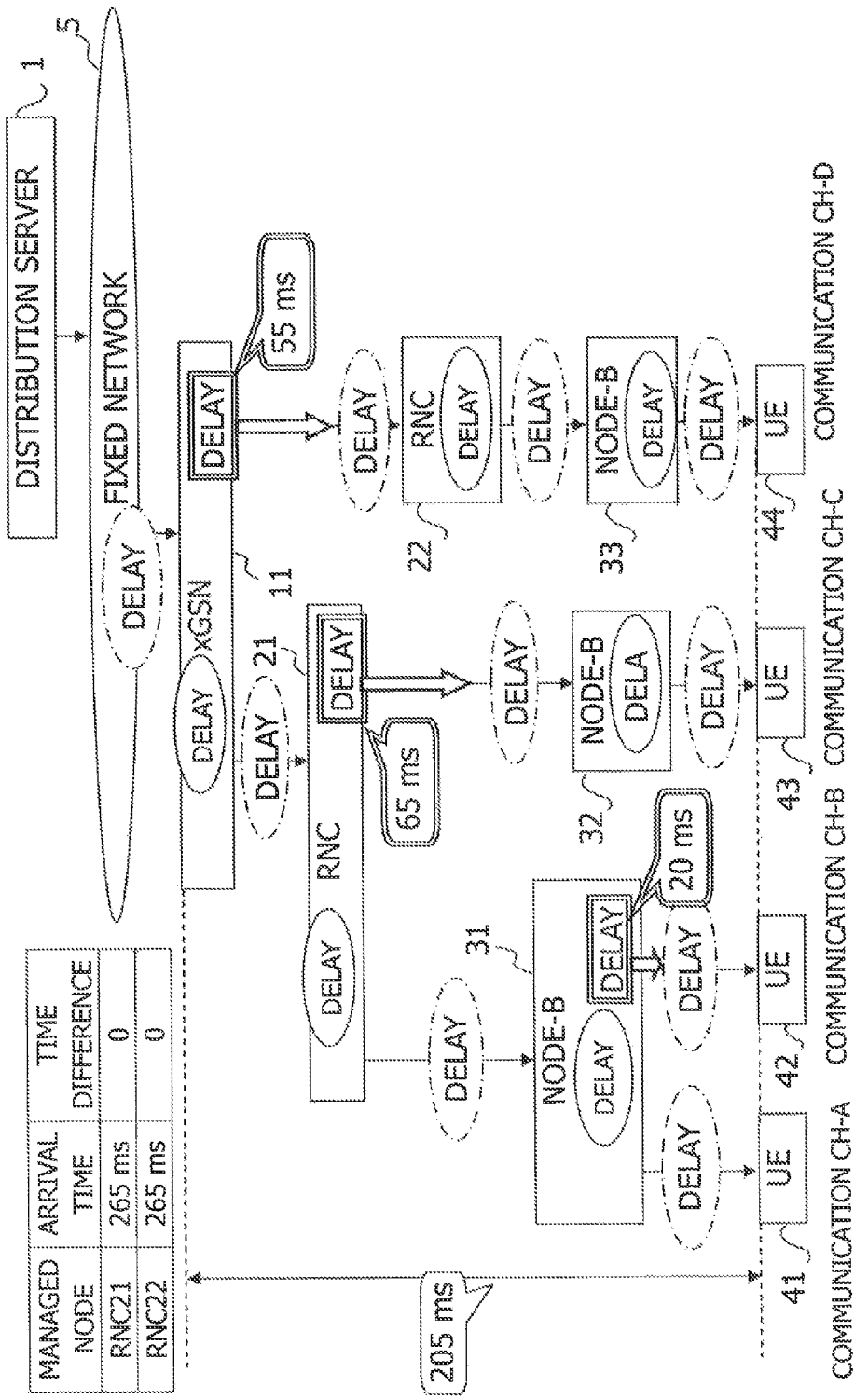
FIG. 14 is a diagram schematically illustrating the operation of the xGSN 11 in the operation sequence in FIG. 6.

The delay inserting unit 57 adds, as the delay, the time-lag (55 ms) calculated by the time-lag calculating unit 56 when transmitting the distribution data to the RNC 22. With this addition, as illustrated in FIG. 14, it follows that the periods of time till the distribution data is received by the UEs 41, 42, 43 and 44 since the distribution data has been received by the xGSN 11, are synchronized.

The xGSN 11 measures and retains the transmission delay time between the distribution server 1 and the xGSN 11 (the external transmission delay time measuring unit 61). Similarly, the xGSN 12 measures and retains the transmission delay time between the distribution server 1 and the xGSN 12. According to the example in FIG. 15, the transmission delay time between the distribution server 1 and the xGSN 11 is 30 ms, and the transmission delay time between the distribution server 1 and the xGSN 12 is 50 ms.

Figure 15:
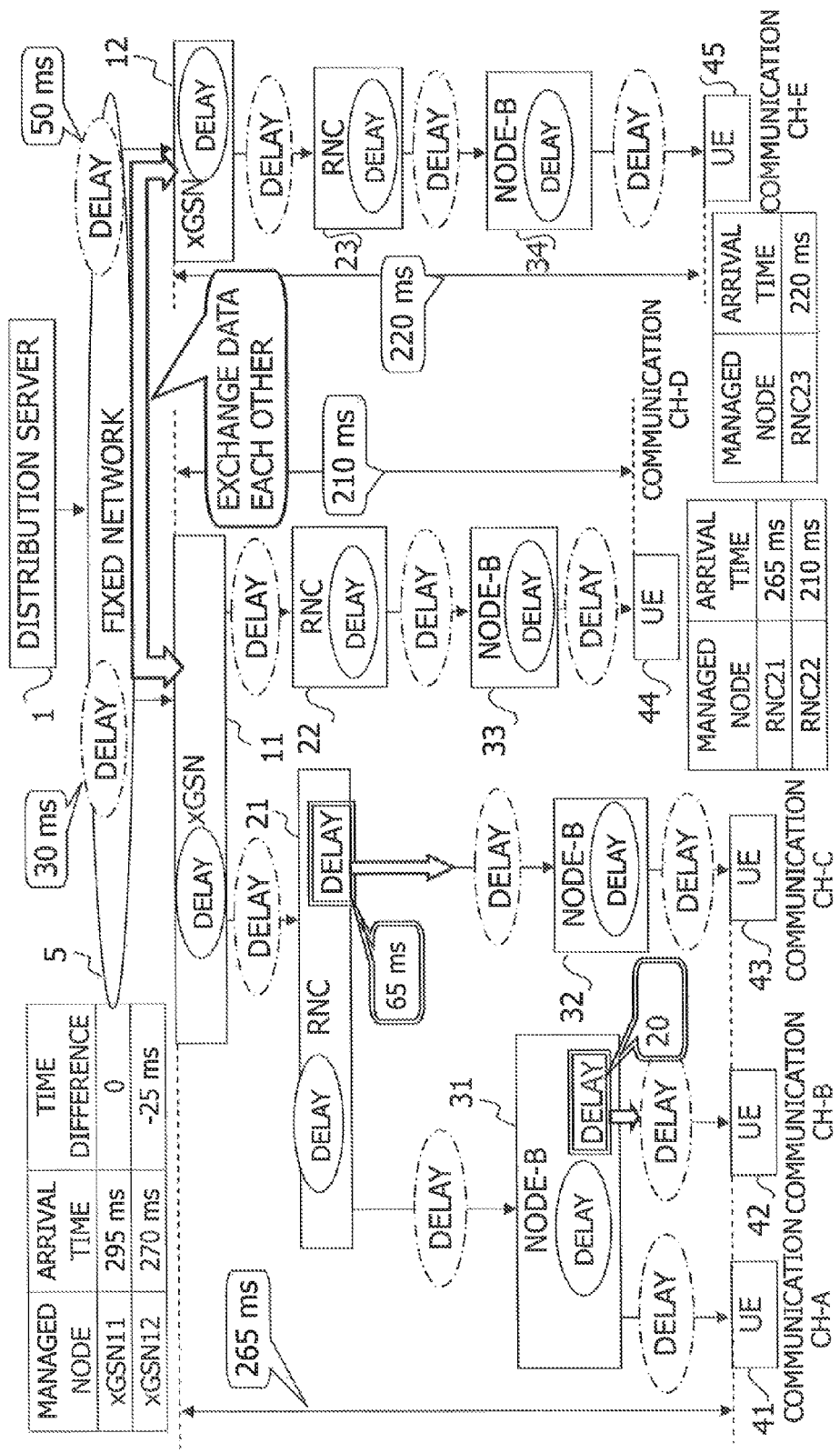
FIG. 15 is a diagram schematically illustrating the operations of the xGSNs 11 and 12 in the operation sequence in FIG. 6.

The xGSN 11, when taking the timing synchronization from the self-node onward as described above, exchanges the information on the timing synchronization with another xGSN 12 (S635; timing exchange). For example, as depicted in FIG. 15, the xGSN 11 transmits, to the xGSN 12, the criterial arrival time (265 ms) determined previously by the time-lag calculating unit 56 and the transmission delay time (30 ms) from the distribution server 1 to the xGSN 11 that is retained by the external transmission delay time measuring unit 61. Reversely, the xGSN 11 receives, from the xGSN 12, the criterial arrival time (220 ms) of the xGSN 12 and the transmission delay time (50 ms) from the distribution server 1 to the xGSN 12.

The xGSN 11, when acquiring the information on the timing synchronization from the xGSN 12, executes the process of taking the timing synchronization between the xGSN 11 and the xGSN 12 (S640). This process, though executed by the host node in the RNC or the NODE-B, is executed by the xGSN itself because of having none of the host node.

In this process, to start with, the total arrival time calculating unit 63 calculates the total arrival time till the distribution data reaches each UE since the distribution data has been transmitted by the distribution server 1 with respect to the via-nodes xGSN 11 and xGSN 12. Herein, the total arrival time (295 ms) related to the xGSN 11 is calculated by adding the transmission delay time (30 ms) from the distribution server 1 to the xGSN 11 to the criterial arrival time (265 ms) determined previously by the time-lag calculating unit 56.

The total arrival time (270 ms) related to the xGSN 12 is calculated by adding the transmission delay time (50 ms) from the distribution server 1 to the xGSN 12 to the criterial arrival time (220 ms) of the xGSN 12. Namely, the total arrival time related to the xGSN 11 is 295 ms, and the total arrival time related to the xGSN 12 is 270 ms.

The total arrival time calculating unit 63 determines the total arrival time related to the xGSN 11 as the criterial arrival time. The total arrival time calculating unit 63 subtracts the total arrival time (270 ms) related to the xGSN 12 from this criterial arrival time (295 ms). Notification saying that the time (25 ms) obtained by this subtraction and the criterial arrival time are the data about the xGSN 11, is sent to the delay correcting unit 64.

Figure 16:
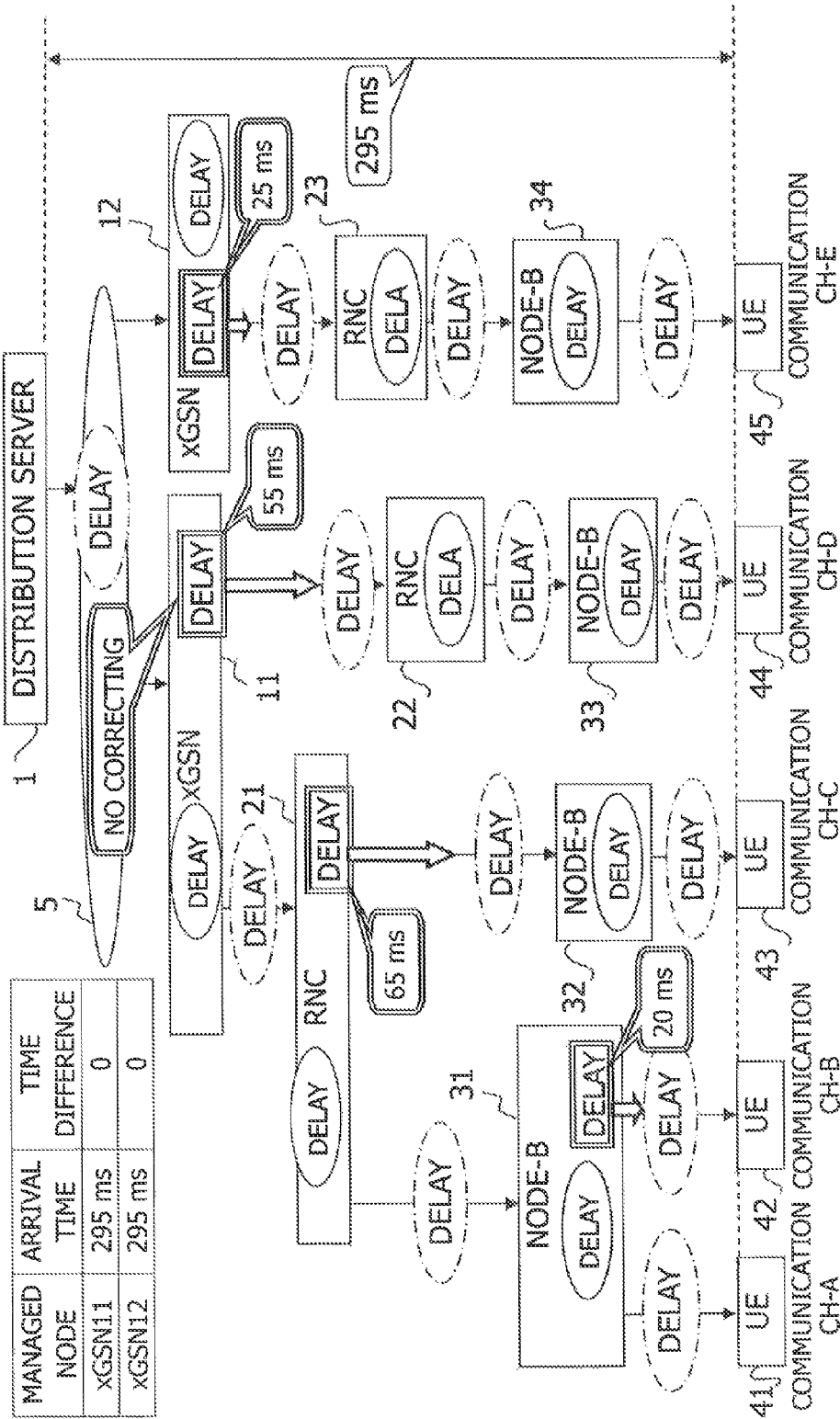
FIG. 16 is a diagram schematically illustrating the operations of the xGSNs 11 and 12 in the operation sequence in FIG. 6.

The delay correcting unit 64 of the xGSN 11, when recognizing that this criterial arrival time is the data related to the self-node, determines that there is no necessity for correcting the delay time (55 ms) added in the previous timing synchronizing process (S630 in FIG. 6, and FIG. 14) (see FIG. 16). On the other hand, the delay correcting unit 64 of the xGSN 12, when recognizing that the criterial arrival time is the data related to another node xGSN 11, newly adds, as the delay, the time-lag (25 ms) of the total arrival time calculated by the total arrival time calculating unit 63 of the xGSN 12 when transmitting the distribution data to the RNC 23. With this addition, as illustrated in FIG. 16, it follows that the periods of time till the distribution data is received by the UEs 41, 42, 43, 44 and 45 since the distribution data has been transmitted by the distribution server 1, are synchronized. Namely, all the UEs can receive at the same timing the distribution data transmitted from the distribution server 1.

The mobile communication system in the embodiment may periodically execute the timing synchronizing process such as this in a way that takes the change in delay on the transmission path and the change in communication speed into consideration. Further, the timing synchronizing process may also be executed at least once when booting the system.

Note that in the example described above, the total arrival time related to the xGSN 11 is longer than the total arrival time related to the xGSN 12, however, a further description will be made, which deals with a case where the total arrival time related to the xGSN 12 is longer than the total arrival time related to the xGSN 11. Herein, it is assumed that the total arrival time related to the xGSN 11 is on the order of 295 ms, and the total arrival time related to the xGSN 12 is on the order of 310 ms.

In this case, the total arrival time calculating unit 63 of the xGSN 11 determines the total arrival time with respect to the xGSN 12 as the criterial arrival time. The total arrival time calculating unit 63 subtracts the total arrival time (295 ms) related to the xGSN 11 from the criterial arrival time (310 ms). Notification saying that the time (15 ms) which is thereby acquired and the criterial arrival time thereof are the data about the xGSN 12, is transmitted to the delay correcting unit 64.

The delay correcting unit 64 of the xGSN 11, when recognizing that this criterial arrival time is not the data about the self-node, corrects the delay time (55 ms) added in the previous timing synchronizing process (S630 in FIG. 6, and FIG. 14). Namely, the delay correcting unit 64 sets the delay time to 70 ms (=55+15), which has already been added to the transmission timing to the RNC 22, and newly adds the delay time (15 ms) to the transmission timing to the RNC 21. On the other hand, the delay correcting unit 64 of the xGSN 12 recognizes that the criterial arrival time is the data about the self-node but does not correct the delay (does not add the delay).

Operations and Effects in Embodiment

Operations and effects of the mobile communication system in the embodiment discussed above will hereinafter be described.

In the mobile communication system of the embodiment, the respective nodes such as the xGSNs 11 and 12, the RNCs 21, 22 and 23 and the NODE-B(s) 31, 32, 33 and 34 are configured in hierarchy, and the data distribution service is provided to the plurality of UEs 41, 42, 43, 44 and 45. Each node, on the occasion of providing the data distribution service, retains the processing delay time of the self-node and the transmission delay time from the self-node to the managed node. The top node xGSN measures and retains the transmission delay time from the distribution server 1 to the self-node (xGSN).

The lowest-order NODE-B calculates the arrival time of each UE by adding the processing delay time of the NODE-B to the transmission delay time to the UE. Further, the longest arrival time in the periods of arrival time at the respective UEs is determined to be the criterial arrival time, and the difference between the arrival time at each UE and the criterial arrival time is calculated. Through this operation, the NODE-B delays (adds the delay to) the transmission timings of the distribution data to the UEs corresponding to the time differences from the criterial arrival time so as to eventually equalize the arrival time at the individual UEs.

With such an operation of the NODE-B, to begin with, the arrival time till the distribution data arrives at each UE since the distribution data has been received by the NODE-B is synchronized.

Thereafter, the host node RNC is notified of the criterial arrival time determined by each NODE-B as the arrival time from the NODE-B onward.

In the RNC, the arrival time from the RNC onward is calculated with respect to each via-node NODE-B by adding the processing delay time of the RNC and the notified transmission delay time to each NODE-B to the arrival time from each NODE-B onward. The longest arrival time in the calculated periods of arrival time from the RNCs onward in regard to the respective nodes NODE-B is determined as the criterial arrival time, and the difference between the arrival time from the RNC with respect to the NODE-B and the criterial arrival time is calculated. Through this operation, the transmission timings of the distribution data to the nodes NODE-B are delayed (the delays are added) corresponding to the time differences from the criterial arrival time so as to eventually equalize the arrival time from the RNCs onward even in the case of passing through every NODE-B.

With such an operation of the RNC, the arrival time till the distribution data arrives at each UE since the distribution data has been received by the RNC is equalized on the route via every NODE-B.

Thereafter, each host node xGSN is notified of the criterial arrival time determined in the RNC as the arrival time from the RNC onward.

In the top node xGSN, similarly to the case of the RNC, the transmission timings of the distribution data to the RNCs are delayed (the delays are added) corresponding to the time differences from the criterial arrival time so as to eventually equalize the arrival time from the xGSNs onward even in the case of passing through every RNC. With this operation, the arrival time till the distribution data arrives at each UE since the distribution data has been received by the xGSN is equalized on the routes via every RNC and every NODE-B.

Thereafter, the criterial arrival time determined by each xGSN is exchanged as the arrival time from the xGSN onward with another xGSN together with the transmission delay time from the distribution server 1 to each xGSN.

The xGSN calculates, based on the information exchanged with another xGSN, the total arrival time till the distribution data arrives at the UE via the xGSN, the RNC and the NODE-B since the distribution data has been transmitted from the distribution server 1 with respect to all the xGSNs. The longest arrival time in the calculated periods of total arrival time in regard to the respective xGSNs is determined to be the criterial arrival time, and the difference between the total arrival time with respect to each xGSN and the criterial arrival time is calculated.

The transmission timings of the distribution data to the RNCs are delayed (the delays are added) corresponding to the time differences from the criterial arrival time so as to eventually equalize the total arrival time even in the case of passing through every xGSN. At this time, the previously added delay time is corrected.

In the mobile communication system of the embodiment, the reception timings of the data distributed from the distribution server 1 can be thereby synchronized in all the UEs.

Modified Example

The embodiment discussed above has exemplified the mobile communication system having the 3-layered (hierarchy) configuration including the lowest-order NODE-B, the RNC having the managed node and the host node and the top node xGSN, however, a mobile communication systems having a 2-layered configuration including the lowest-order node and the highest-order node and a mobile communication system having 4-or-more-layered configuration are also available. The lowest-order is enough to have the same functions as those of the NODE-B described above, the highest-order node is enough to have the same functions as those of the xGSN described above, and the intermediate layer node including the managed node and the host node is enough to have the same functions as those of the RNC described above.

Moreover, the mobile communication system of the embodiment discussed above executes the timing synchronizing process related to the distribution data distributed to each UE from the distribution server 1. The embodiment is, however, flexible to a configuration in which the predetermined UE distributes the distribution data to the plurality of UEs.

Such a case results in consuming futile communication resources and communication time if the distribution is distributed from the distribution server as described above after uploading the distribution data temporarily into the distribution server 1 from the distributor UE.

Figure 17:
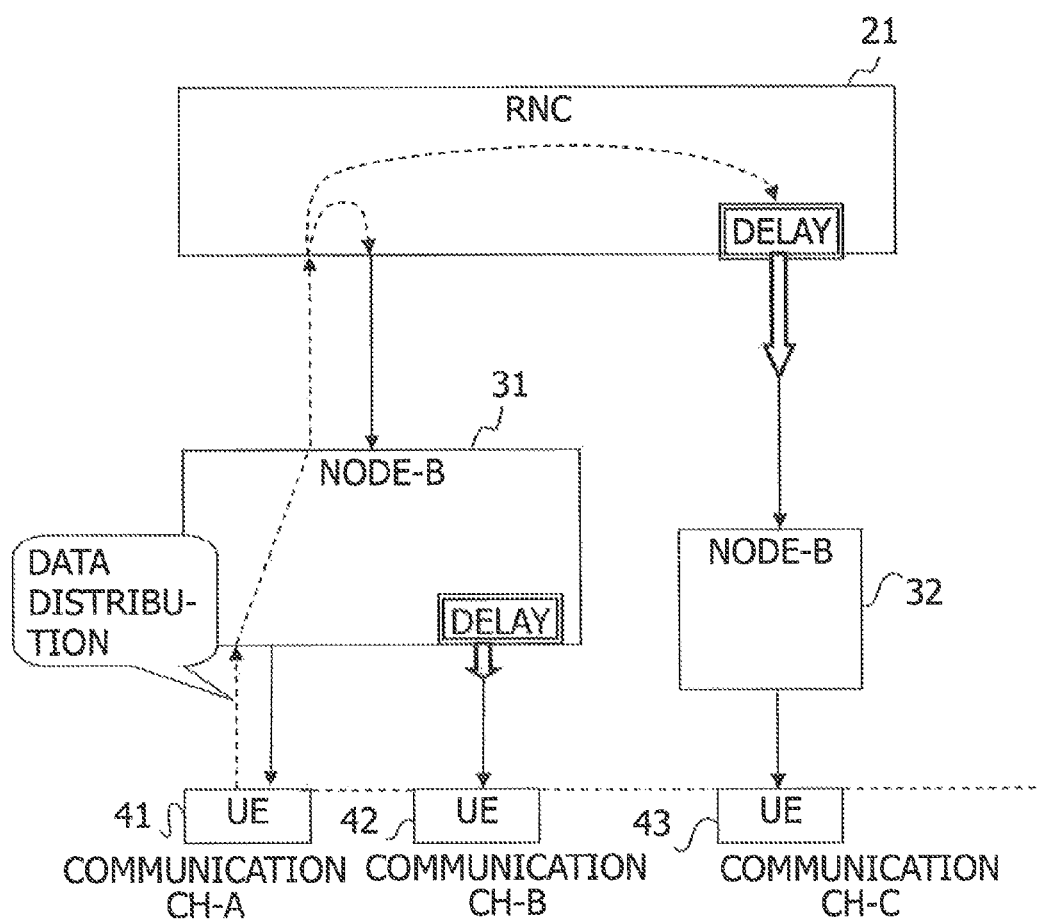
FIG. 17 is a diagram illustrating a modified example of the mobile communication system in the embodiment.

Accordingly, in this case, as illustrated in FIG. 17, the predetermined node within the mobile communication system in the embodiment distributes in loopback (multicasts or broadcasts) the distribution data transmitted from the distributor UE.

FIG. 17 is a diagram illustrating a modified example of the mobile communication system in the embodiment. According to the example of FIG. 17, it is sufficient that the distribution data is distributed to the UEs 42 and 43 from the UE 41, and hence the distribution data is looped back within the RNC 21. In this example, it is also enough that the arrival time from the RNC 21 onward is synchronized, and therefore the RNC 21 and the NODE-B 31 add the delay. The technique of calculating the delay time added involves taking the same technique as in the embodiment discussed above. With this contrivance, the data arrival timings in the respective managed nodes can be synchronized in the same way as the technique of the embodiment described above.

It should be noted that corresponding to the target UE as the distributing destination, the distribution data may be looped back at the xGSN and may also be distributed in a way that forwards the data to the xGSN different from the xGSN to which the distributor UE is connected. In this case also, it is sufficient that the same timing synchronizing process as in the embodiment discussed above is executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication apparatus to manage a plurality of nodes which perform communications with a plurality of terminal devices, the communication apparatus comprising:
a processing information acquiring unit to acquire processing delay time after distribution data has been received by the communication apparatus until the distribution data is transmitted from the communication apparatus;
a transmission information acquiring unit to acquire each transmission delay time after the distribution data has been transmitted from the communication apparatus until the distribution data is received by each of the nodes;
a collecting unit to collect, as a first time length, each period of time after the distribution data has been received by each of the nodes until the distribution data arrives at each of the plurality of terminal devices;
a calculating unit to calculate, as a second time length, each period of time after the distribution data has been received by the communication apparatus until the distribution data arrives at each of the plurality of terminal devices for each of the nodes based on the processing delay time, the each transmission delay time and each period of the first time length;
a transmission control unit to control a transmission timing of the distribution data to at least one of the plurality of nodes based on each period of the second time length for each of the nodes;
a criterion determining unit to determine, as criterial arrival time, the longest period of the second time length among each period of the second time length;
a transmitting unit to transmit the criterial arrival time to communication apparatuses except the communication apparatus;
an external information acquiring unit to acquire external transmission delay time after the distribution data has been transmitted from an external server until the distribution data is received by the communication apparatus;
a receiving unit to receive external transmission delay time and criterial arrival time with respect to another communication apparatus from the another communication apparatus, the external transmission delay time with respect to the another communication apparatus being acquired by the another communication apparatus and the criterial arrival time with respect to the another communication apparatus being calculated by the another communication apparatus; and a total arrival time calculating unit to calculate total arrival time with respect to the communication apparatus after the distribution data has been transmitted from the external server until the distribution data arrives at each of the plurality of terminal devices via the communication apparatus based on the criterial arrival time determined by the criterion determining unit and the external transmission delay time acquired by the external information acquiring unit, and to calculate total arrival time with respect to another communication apparatus after the distribution data has been transmitted from the external server until the distribution data arrives at each of the plurality of terminal devices via the another communication apparatus based on the external transmission delay time and the criterial arrival time with respect to the another communication apparatus that are received by the receiving unit, wherein the transmission control unit corrects delay time which is time difference between the criterial arrival time with respect to the communication apparatus and another second time length based on the total arrival time of the communication apparatus and the total arrival time of the another communication apparatus, and delays the transmission timing of the distribution data based on the corrected delay time.

2. The communication apparatus according to claim 1, wherein the distribution data is distributed from the external server or distributed from at least one of the plurality of terminal devices, and the communication apparatus further comprises:

a loopback transmitting unit to transmit, when the distribution data is distributed from at least one of the plurality of terminal devices, the distribution data received from at least one of the plurality of nodes to any plural nodes among the plurality of nodes.

3. A data reception timing synchronizing method in a communication apparatus to manage a plurality of nodes which perform communications with a plurality of terminal devices, the data reception timing synchronizing method including:

acquiring processing delay time after distribution data has been received by the communication apparatus until the distribution data is transmitted from the communication apparatus;

acquiring each transmission delay time after the distribution data has been transmitted from the communication apparatus until the distribution data is received by each of the nodes;

collecting, as a first time length, each period of time after the distribution data has been received by each of the nodes until the distribution data arrives at each of the plurality of terminal devices;

respectively calculating, as a second time length, each period of time after the distribution data has been received by the communication apparatus until the distribution data arrives at each of the plurality of terminal devices for each of the nodes based on the processing delay time, the each transmission delay time and each period of the first time length;

controlling a transmission timing of the distribution data to at least one of the plurality of nodes based on each period of the second time length for each of the nodes;

determining, as criterial arrival time, the longest period of the second time length among each period of the second time length;

transmitting the criterial arrival time to communication apparatuses except the communication apparatus;

acquiring external transmission delay time after the distribution data has been transmitted from an external server until the distribution data is received by the communication apparatus;

receiving external transmission delay time and criterial arrival time with respect to another communication apparatus from the another communication apparatus, the external transmission delay time with respect to the another communication apparatus being acquired by the another communication apparatus and the criterial arrival time with respect to the another communication apparatus being calculated by the another communication apparatus; and calculating total arrival time with respect to the communication apparatus after the distribution data has been transmitted from the external server until the distribution data arrives at each of the plurality of terminal devices via the communication apparatus based on the determined criterial arrival time and the acquired external transmission delay time, and calculating total arrival time with respect to another communication apparatus after the distribution data has been transmitted from the external server until the distribution data arrives at each of the plurality of terminal devices via the another communication apparatus based on the received external transmission delay time and the received criterial arrival time with respect to the another communication apparatus, wherein the controlling corrects delay time which is time difference between the criterial arrival time with respect to the communication apparatus and another second time length based on the total arrival time of the communication apparatus and the total arrival time of the another communication apparatus, and delays the transmission timing of the distribution data based on the corrected delay time.

* * * * *